(12) United States Patent
Overton et al.

(10) Patent No.: US 7,814,170 B2
(45) Date of Patent: *Oct. 12, 2010

(54) NETWORK DISTRIBUTED TRACKING WIRE TRANSFER PROTOCOL

(75) Inventors: John K. Overton, Chicago, IL (US); Stephen W. Bailey, Chicago, IL (US)

(73) Assignee: Econnectix Corporation, Chicago, IL (US)

( * ) Notice: Subject to any disclaimer, the term of this patent is extended or adjusted under 35 U.S.C. 154(b) by 749 days.

This patent is subject to a terminal disclaimer.

(21) Appl. No.: 11/354,224

(22) Filed: Feb. 13, 2006

(65) Prior Publication Data

US 2007/0011267 A1 Jan. 11, 2007

Related U.S. Application Data

(63) Continuation of application No. 09/661,222, filed on Sep. 13, 2000, now Pat. No. 7,103,640, and a continuation-in-part of application No. 09/111,896, filed on Jul. 8, 1998, now abandoned.

(60) Provisional application No. 60/153,709, filed on Sep. 14, 1999.

(51) Int. Cl.
G06F 15/16 (2006.01)
G06F 17/30 (2006.01)
(52) U.S. Cl. .................... 709/217; 709/219; 707/10
(58) Field of Classification Search ............ 709/217, 709/223, 238, 219; 707/10
See application file for complete search history.

(56) References Cited

U.S. PATENT DOCUMENTS

| 4,553,261 A | 11/1985 | Froessl |
| 4,636,858 A | 1/1987 | Hague |

(Continued)

FOREIGN PATENT DOCUMENTS

EP 0 568 161 A1 1/1992

(Continued)

OTHER PUBLICATIONS

D.G. Bourke et al., Programmable Module and Circuit for Machine-Readable Unique Serial Number, IBM Technical Disclosure Bulletin, vol. 27, No. 4A, Sep. 1, 1984, pp. 1942-1944.

(Continued)

*Primary Examiner*—Larry Donaghue
*Assistant Examiner*—Brian J Gillis
(74) *Attorney, Agent, or Firm*—Brinks Hofer Gilson & Lione

(57) ABSTRACT

A network distributed tracking wire transfer protocol for storing and retrieving data across a distributed data collection. The protocol includes a location string for specifying the network location of data associated with an entity in the distributed data collection, and an identification string for specifying the identity of an entity in the distributed data collection. According to the protocol, the length of the location string and the length of the identification string are variable, and an association between an identification string and a location string can be spontaneously and dynamically changed. The network distributed tracking wire transfer protocol is application independent, organizationally independent, and geographically independent. A method for using the protocol in a distributed data collection environment and a system for implementing the protocol are also provided.

17 Claims, 12 Drawing Sheets

U.S. PATENT DOCUMENTS

| | | |
|---|---|---|
| 4,728,978 A | 3/1988 | Inoue et al. |
| 4,800,488 A | 1/1989 | Agrawal et al. |
| 4,825,406 A | 4/1989 | Bean et al. |
| 4,835,372 A | 5/1989 | Gombrich et al. |
| 4,914,571 A | 4/1990 | Baratz et al. |
| 5,008,700 A | 4/1991 | Okamoto |
| 5,124,814 A | 6/1992 | Takahashi et al. |
| 5,193,185 A | 3/1993 | Lanter |
| 5,208,623 A | 5/1993 | Takahashi |
| 5,276,735 A | 1/1994 | Boebert et al. ............... 380/21 |
| 5,291,399 A | 3/1994 | Chaco |
| 5,319,401 A | 6/1994 | Hicks |
| 5,345,586 A | 9/1994 | Hamala et al. ............. 395/650 |
| 5,347,600 A | 9/1994 | Barnsley |
| 5,384,643 A | 1/1995 | Inga et al. |
| 5,414,841 A | 5/1995 | Bingham et al. |
| 5,454,101 A | 9/1995 | Mackay et al. |
| 5,455,648 A | 10/1995 | Kazami |
| 5,475,817 A | 12/1995 | Waldo et al. |
| 5,479,654 A | 12/1995 | Squibb |
| 5,491,511 A | 2/1996 | Olde |
| 5,499,113 A | 3/1996 | Tsuboi |
| 5,522,077 A | 5/1996 | Cuthbert et al. |
| 5,537,547 A | 7/1996 | Chan et al. |
| 5,550,981 A | 8/1996 | Bauer et al. |
| 5,551,027 A | 8/1996 | Choy et al. |
| 5,557,790 A | 9/1996 | Bingham et al. |
| 5,560,005 A | 9/1996 | Hoover et al. |
| 5,576,952 A | 11/1996 | Stutman et al. |
| 5,579,067 A | 11/1996 | Wakabayashi |
| 5,610,653 A | 3/1997 | Abecassis |
| 5,617,570 A | 4/1997 | Russell et al. |
| 5,625,841 A | 4/1997 | Dawkins et al. |
| 5,649,247 A | 7/1997 | Itoh et al. |
| 5,664,170 A | 9/1997 | Taylor |
| 5,669,029 A | 9/1997 | Fyson et al. |
| 5,724,575 A | 3/1998 | Hoover et al. |
| 5,740,428 A | 4/1998 | Mortimore et al. |
| 5,764,889 A | 6/1998 | Ault et al. |
| 5,764,906 A | 6/1998 | Edelstein et al. |
| 5,774,670 A | 6/1998 | Montulli |
| 5,781,725 A | 7/1998 | Saito |
| 5,784,565 A | 7/1998 | Lewine |
| 5,802,518 A | 9/1998 | Karaev et al. |
| 5,809,161 A | 9/1998 | Auty |
| 5,809,331 A | 9/1998 | Staats et al. |
| 5,809,495 A | 9/1998 | Loaiza |
| 5,813,006 A | 9/1998 | Polnerow et al. |
| 5,832,487 A | 11/1998 | Olds et al. |
| 5,848,246 A | 12/1998 | Gish |
| 5,864,482 A | 1/1999 | Hazama |
| 5,872,973 A | 2/1999 | Mitchell et al. |
| 5,875,302 A | 2/1999 | Obhan |
| 5,903,889 A | 5/1999 | De la Huerga et al. |
| 5,907,837 A | 5/1999 | Ferrel et al. |
| 5,913,210 A | 6/1999 | Call |
| 5,915,240 A | 6/1999 | Karpf |
| 5,918,214 A | 6/1999 | Perkowski |
| 5,920,702 A | 7/1999 | Bleidt et al. |
| 5,940,844 A | 8/1999 | Cahill et al. |
| 5,950,173 A | 9/1999 | Perkowski |
| 5,961,610 A | 10/1999 | Kelly et al. |
| 5,966,705 A | 10/1999 | Koneru et al. |
| 5,974,124 A | 10/1999 | Schlueter, Jr. et al. |
| 5,974,409 A | 10/1999 | Sanu et al. |
| 5,978,773 A | 11/1999 | Hudetz et al. |
| 5,987,519 A | 11/1999 | Peifer et al. |
| 5,995,965 A | 11/1999 | Experton |
| 6,032,175 A | 2/2000 | Fletcher et al. |
| 6,047,332 A | 4/2000 | Viswanathan et al. |
| 6,055,544 A | 4/2000 | DeRose et al. |
| 6,058,193 A | 5/2000 | Cordery et al. |
| 6,070,191 A | 5/2000 | Narendran et al. .......... 709/226 |
| 6,092,189 A | 7/2000 | Fisher et al. |
| 6,108,787 A | 8/2000 | Anderson et al. |
| 6,131,095 A * | 10/2000 | Low et al. ..................... 707/10 |
| 6,154,738 A | 11/2000 | Call |
| 6,167,438 A | 12/2000 | Yates et al. ................. 709/216 |
| 6,188,766 B1 | 2/2001 | Kocher |
| 6,201,931 B1 | 3/2001 | Cipolla et al. |
| 6,202,070 B1 | 3/2001 | Nguyen et al. |
| 6,209,095 B1 | 3/2001 | Anderson et al. |
| 6,212,280 B1 | 4/2001 | Howard, Jr. et al. |
| 6,370,584 B1 * | 4/2002 | Bestavros et al. ........... 709/238 |
| 6,374,253 B1 | 4/2002 | Weider et al. ............... 707/102 |
| 6,377,986 B1 | 4/2002 | Philyaw et al. |
| 6,418,441 B1 | 7/2002 | Call |
| 6,438,652 B1 | 8/2002 | Jordan et al. |
| 6,453,404 B1 | 9/2002 | Bereznyi et al. ............ 711/171 |
| 6,463,454 B1 | 10/2002 | Lumelsky et al. |
| 6,466,980 B1 | 10/2002 | Lumelsky et al. |
| 6,470,389 B1 * | 10/2002 | Chung et al. ................ 709/227 |
| 6,578,068 B1 | 6/2003 | Bowman-Amuah |
| 6,594,253 B1 | 7/2003 | Sallberg et al. ............. 370/349 |
| 6,711,408 B1 | 3/2004 | Raith |
| 7,103,640 B1 | 9/2006 | Overton et al. |
| 7,233,978 B2 | 6/2007 | Overton et al. |
| 7,272,625 B1 | 9/2007 | Hannel et al. ............... 709/200 |
| 7,349,902 B1 | 3/2008 | Arlitt et al. .................... 707/8 |
| 7,634,453 B1 | 12/2009 | Bakke et al. ................... 707/1 |
| 2001/0013059 A1 | 8/2001 | Dawson et al. ............. 709/217 |
| 2002/0112048 A1 | 8/2002 | Gruyer et al. |
| 2003/0065653 A1 | 4/2003 | Overton et al. |
| 2004/0205055 A1 | 10/2004 | Overton et al. |
| 2008/0005275 A1 | 1/2008 | Overton et al. |

FOREIGN PATENT DOCUMENTS

| | | |
|---|---|---|
| EP | 0 889 422 A2 | 1/1999 |
| WO | WO 86/05610 | 9/1986 |
| WO | WO 98/15910 | 4/1998 |
| WO | WO 98/31138 | 7/1998 |
| WO | WO 00/32526 | 1/2000 |

OTHER PUBLICATIONS

Kleinholz, L. et al., Supporting Cooperative Medicine: The Bermed Project, IEEE Multimedia, vol. 1, No. 4, Dec. 21, 1994, pp. 44-53.

Method for Network Naming and Routing, IBM Technical Disclosure Bulletin, vol. 37, No. 9, Sep. 1, 1994, pp. 255-256.

Minimizing Locking to Access Global Shared Data, IBM Technical Disclosure Bulletin, Feb. 1995, pp. 619-622.

R. Muniz et al., A Robust Software Barcode Reader Using the Hough Transform, Abstract, 1999, International Conference on Information Intelligence and Systems (Oct. 31 to Nov. 3, 1999).

D. Fresonke, In-fab Identification of Silicon Wafers With Clean, Laser Marked Barcodes, Abstract, 1994, IEEE/Semi Advanced Semiconductor Manufacturing Conference and Workshop (Nov. 14 to Nov. 16, 1994).

T. Sriram et al., Applications of Barcode Technology in Automated Storage and Retrieval Systems, Abstract, Proceedings of the 1996 IEEE IECON 22$^{nd}$ International Conference on Industrial Electrodes (Aug. 5 to Aug. 10, 1996).

V.L. Callaghan et al., Structures and Metrics for Image Storage and Interchange, Journal of Electronic Imaging, vol. 2, No. 2, Apr. 1, 1993, pp. 126-137.

Beitz et al., Service Location in an Open Distributed Environment, Second International Workshop on Services in Distributed and Networked Environments, IEEE Computer Society Press, Jun. 1995, pp. 28-34.

Office Action, dated Mar. 30, 2010, pp. 1-12, U.S. Appl. No. 11/803,332, U.S. Patent and Trademark Office, Virginia.

Notice of Allowance, dated May 19, 2010, pp. 1-8, U.S. Appl. No. 10/646,350, U.S. Patent and Trademark Office, Virginia.

* cited by examiner

Use Of Request Identifiers

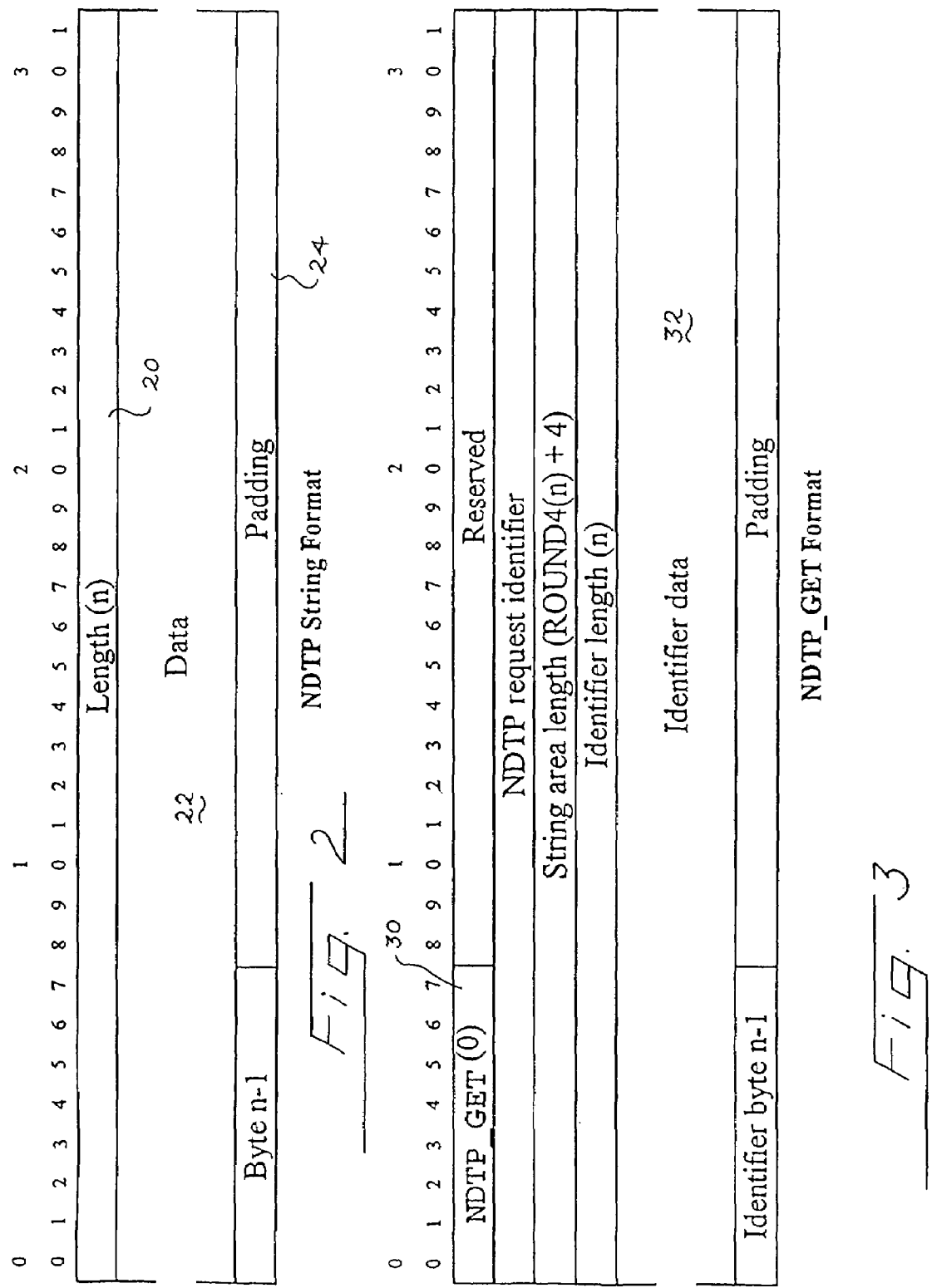

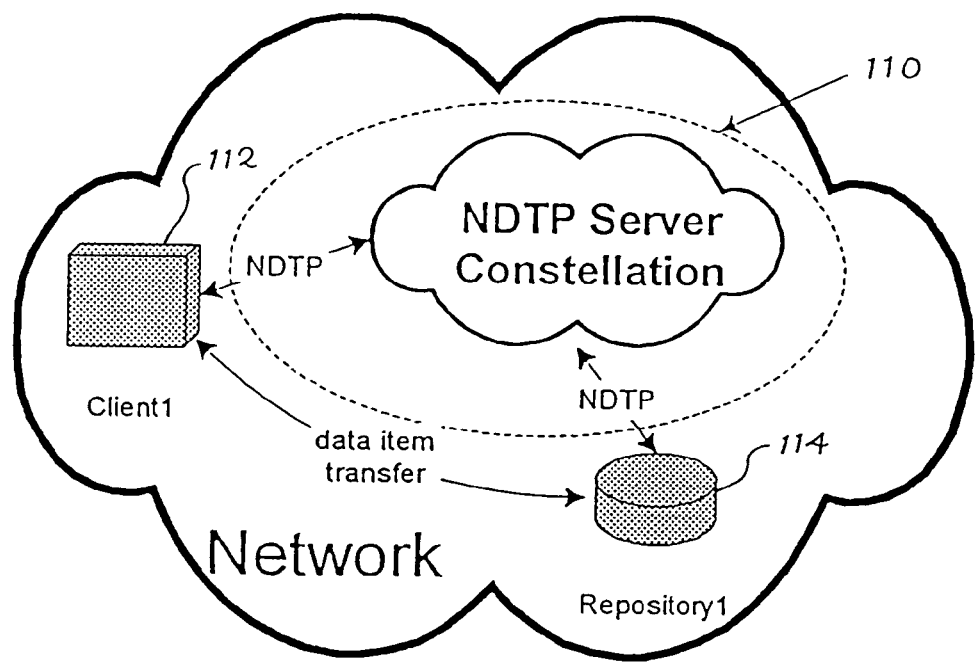
Fig. 11  NDTP Server Constellation Context
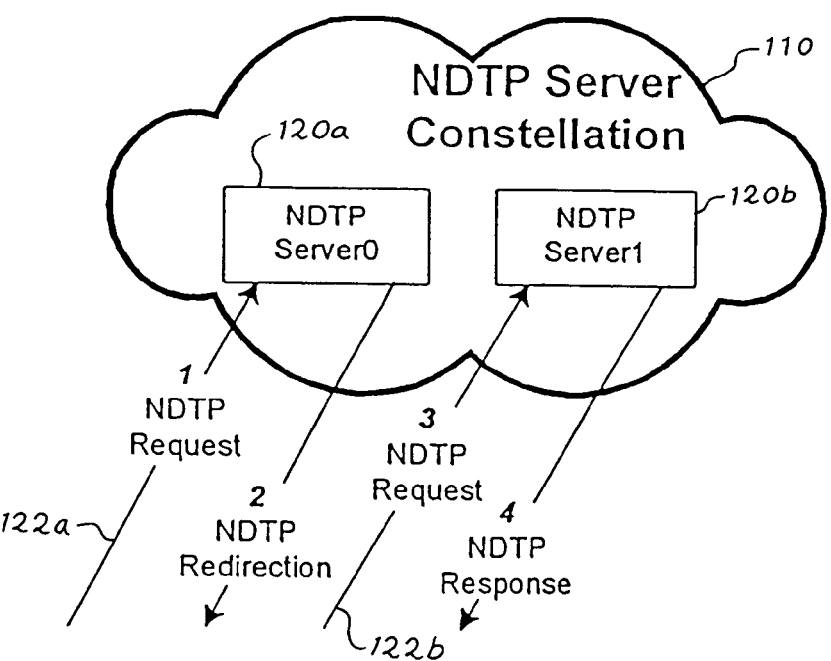
Fig. 12  NDTP Client-Centric Constellation NDTP Server-Centric Constellation even pages# NETWORK DISTRIBUTED TRACKING WIRE TRANSFER PROTOCOL

RELATED APPLICATIONS

This application is a continuation of U.S. application Ser. No. 09/661,222 filed Sep. 13, 2000, now U.S. Pat. No. 7,103,640, the entirety of which is hereby incorporated by reference, which claims the benefit of U.S. patent application Ser. No. 60/153,709, entitled SIMPLE DATA TRANSPORT PROTOCOL METHOD AND APPARATUS, filed on Sep. 14, 1999, and is a continuation-in-part of U.S. application Ser. No. 09/111,896, entitled SYSTEM AND METHOD FOR ESTABLISHING AND RETRIEVING DATA BASED ON GLOBAL INDICES, filed on Jul. 8, 1998, abandoned.

MICROFICHE/COPYRIGHT REFERENCE

A Microfiche Appendix (143 frames, 2 sheets) is included in this application that contains material which is subject to copyright protection. The copyright owner has no objection to the facsimile reproduction by anyone of the Microfiche Appendix, as it appears in the Patent and Trademark Office patent files or records, but otherwise reserves all copyright rights whatsoever.

FIELD OF THE INVENTION

This invention relates generally to the storage and retrieval of information, and in particular, to a protocol for dynamic and spontaneous global search and retrieval of information across a distributed network regardless of the data format.

BACKGROUND OF THE INVENTION

Data can reside in many different places. In existing retrieval systems and methods, a client seeking information sends a request to a server. Typically, only data that are statically associated with that server are returned. Disadvantageously, the search is also usually restricted to previously known systems. The search is thus conducted only where the server knows in advance to look.

Another disadvantage of known retrieval systems is the difficulty in accessing data in different forms. Known retrieval systems are typically designed to search for data in limited forms. One example is where a client requests files based on a subject, like a person's name. In the search results, therefore, only text files of peoples' names may be retrieved. Another problem in current retrieval systems is that the client may receive text and image files in the search results, but could not seamlessly access the image files. Yet another problem in current retrieval systems is that video and sound files related to the request may not even be found in the search results. For example, a doctor might be able to retrieve medical records on a specific patient, but cannot view an MRI or X-Ray results associated with that record.

A distributed data collection is a system where data is stored and retrieved among multiple machines connected by a network. Typically, each machine in which some portion of the data in a distributed data collection may reside is called a "data repository machine", or simply a "data repository". One commonly asked question in a data repository environment is: Where is data associated with a particular entity in a distributed data collection? The data location is a key question when a distributed data collection has highly dynamic data distribution properties.

In networked environments where there are a large number of data repositories and any particular entity does not store data in all the repositories, a mechanism is needed that would permit queries to be directed only at data repositories with relevant information. It would also be beneficial to permit membership in the set of data repositories itself to be highly dynamic. Such a system would support on-the-fly addition and removal of data repositories from a distributed data collection seamlessly and without the need to reprogram the client and server participants.

BRIEF SUMMARY OF THE INVENTION

In view of the above, the invention provides a network distributed tracking wire transfer protocol, and a system and method for using the protocol in a networked environment. The network distributed tracking wire transfer protocol includes two basic components: identification strings for specifying the identity of an entity in the distributed data collection, and location strings for specifying network locations of data associated with an entity. The protocol accommodates variable length identifier and location strings. Relationships between identification strings and location strings can be dynamically and spontaneously manipulated thus allowing the corresponding data relationships also to change dynamically, spontaneously, and efficiently. In addition, the network distributed tracking wire transfer protocol is application independent, organizationally independent, and geographically independent.

In another aspect of the invention, a system of components using the network distributed tracking protocol are provided for storing and identifying data with a distributed data collection. The components include (1) a data repository for storing data in the distributed data collection, (2) a client entity for manipulating data in the distributed data collection, and (3) a first server entity operative to locate data in the distributed data collection, which may be coupled to a client entity and/or data repository. In a network with these components, a client entity transmits an identifier string to the first server entity along with the client request, and the first server entity provides a set of location strings to the client entity in response thereto. The first server entity maps the identifier string received from the client entity to a set of location strings. The network may also include any number of additional server entities coupled to the first server entity.

According to yet another aspect of the invention, a method is provided for storing and retrieving tracking information over a network using a wire transfer protocol. A location string specifies the location of data associated with an entity in the distributed data collection and the identification string specifies the identification of an entity in a distributed data collection. A first data repository entity stores data by associating an identification string with each particular stored unit of data, and by mapping the identification string to a location string associated with the first data repository. The identification string and location string for the particular unit of data are at a first server entity coupled to the first data repository entity. A request is transmitted from a client entity to the first server entity to retrieve at least one location string associated with the stored unit of data in the distributed data collection. The request includes the identification string associated with the particular stored unit of data. The request is received at the first server entity, which responds to the client entity by providing at least one location string associated with the particular stored unit of data to the client entity.

The request may also be transmitted to a second server entity prior to responding to the client entity, where the second server entity is coupled to the first server entity and includes the mapping of the identification string and location strings for the particular units of data. In such case, the second server entity responds to the client entity by providing the at least one location string associated with the particular stored unit of data to the client entity.

The network distributed tracking protocol of the invention is a networking protocol that efficiently manages mappings from one or more identifier strings to zero or more location strings. The protocol permits client entities to add and remove identifier/location associations, and request the current set of locations for an identifier or identifiers from server entities that comply with the protocol.

The protocol is designed for use in the larger context of a distributed data collection. As such, it supports an architecture in which information about where data associated with particular application entities can be managed and obtained independently of the data itself. The protocol and its associated servers thus maintain a mapping between entity identifiers and data locations. The identifier/location mapping maintained by the servers is very dynamic. Regardless of the expected system context in a distributed data collection, the protocol can be used for any application in which one-to-one or one-to-many associations among strings are to be maintained and accessed on a network.

In any context, the protocol supports identifier and location strings of up to $2^{32}$-4 bytes in length, but in most applications it is expected that the strings are typically short. String length is not fixed by the protocol, except by the upperbound. Accordingly, string formats are controlled at a local level and not dictated by the protocol.

These and other features and advantages of the invention will become apparent upon a review of the following detailed description of the presently preferred embodiments of the invention, when viewed in conjunction with the appended drawings.

BRIEF DESCRIPTION OF THE DRAWINGS

FIG. 2 is a layout of one presently preferred string format.

FIG. 3 is a layout of one presently preferred NDTP_GET message.

FIG. 9 is a layout of one presently preferred NDTP_RDR_RSP message, where

FIG. 11 is a system diagram showing an NDTP server constellation configuration.

FIG. 12 is a system diagram showing a client-centric constellation approach.

DETAILED DESCRIPTION OF THE PRESENTLY PREFERRED EMBODIMENTS OF THE INVENTION

Figure 1:
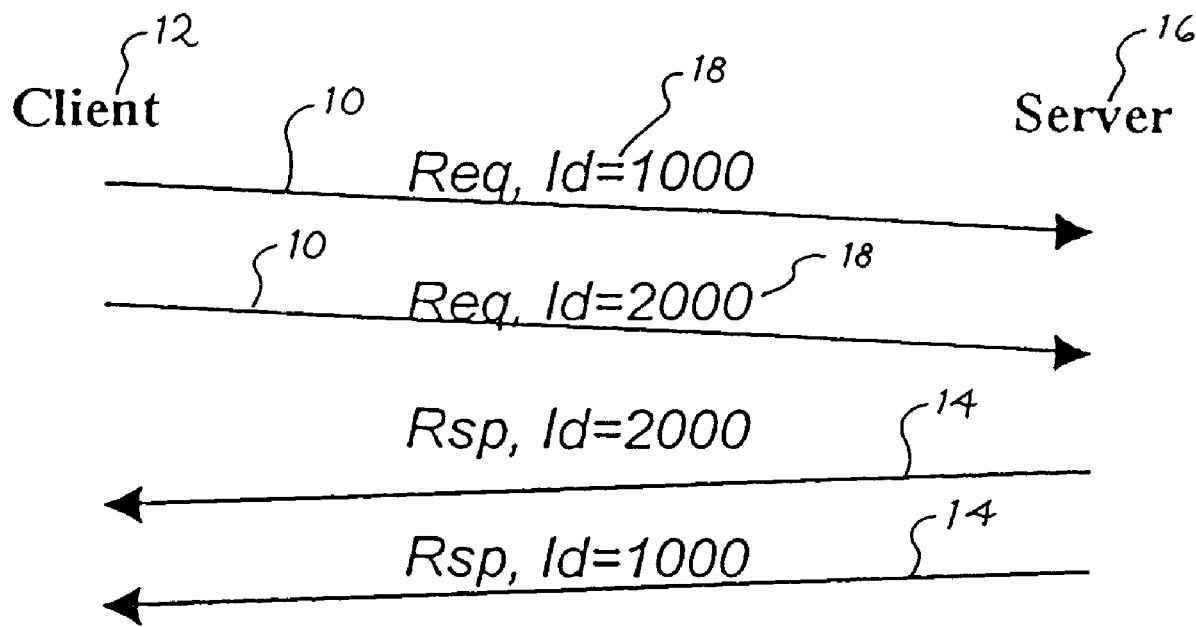
FIG. 1 is an example of multiple outstanding protocol requests.

The following terms are used to describe the operation of the presently preferred network distributed tracking protocol (NDTP). An "identifier string" or an "identifier" is a unique string with which zero or more location strings are associated in an NDTP server. A "data location" or a "location" is a string that is a member of a set of strings associated with an identifier string in an NDTP server. An "NDTP client" or a "client" is a network-attached component that initiates update or lookup of identifier/location mappings from an NDTP server with NDTP request messages. An "NDTP server" or a "server" is a network-attached component that maintains a set of identifier/location mappings that are modified or returned in response to NDTP request messages from NDTP clients. The term "Network Byte Order" is the ordering of bytes that compose an integer of larger than a single byte as defined in the Internet Protocol (IP) suite. Preferably, Network Byte Order specifies a big-endian, or most significant byte first, representation of multibyte integers. In this specification a byte is preferably composed of eight bits.

Network Distributed Tracking Protocol (NDTP)

The Network Distributed Tracking Protocol (NDTP) efficiently tracks the location of data associated with an individual entity in a distributed data collection. NDTP is a transactional protocol, which means that each operation within NDTP consists of a request message from an NDTP client to an NDTP server, followed by an appropriate response message from the NDTP server to the NDTP client. NDTP defines an entity key (or "identifier") as a unique string used to refer to an entity about which a distributed query is performed.

The NDTP server treats the entity key as an unstructured stream of octets, which is assumed to be unique to a particular entity. The precise structure of the NDTP entity key and the mechanism for ensuring its uniqueness are a function of the application in which the NDTP server is used. In a customer oriented application, the NDTP entity key might be a unique customer identifier, for example, a Social Security Number, in either printable or binary integer form, as is appropriate to the application. NDTP also defines a data location specifier as a string used to specify a data respository in which data associated with a particular entity may be found.

As with NDTP entity keys, the NDTP server treats NDTP data location specifiers as unstructured streams of octets. The structure of an NDTP data location specifier is a function of the application in which the NDTP server is used. For example, an NDTP data location specifier might be an Internet machine name, and a TCP/IP port number for a relational database server, or an HTTP Universal Resource Locator (URL), or some concatenation of multiple components.

The NDTP server efficiently maintains and dispenses one to zero or one to many relationships between entity keys and data location specifiers. In other words, an entity key may be associated with any number of data location specifiers. When data for a particular entity is added to a data repository, the NDTP server is updated to indicate an association between the entity key and the data repository's data location specifier. When a query is performed for an entity key, the NDTP server supplies the set of data repositories in which data may be found for that entity key.

General NDTP Mechanics

The protocol of the invention is designed to provide maximum transaction throughput from the NDTP server, associated clients, and associated data repositories when appropriate. The design goal is realized through two design principles:
1. NDTP messages should preferably be as short as possible to maximize the rate of NDTP transactions for a given network communication bandwidth.
2. NDTP messages should preferably be structured for efficient processing on existing machine architectures.

Design Optimizations.

Numerical fields of an NDTP message are preferably represented in binary integer format rather than ASCII or other printable format to minimize host processing overhead and network utilization. Numerical fields of NDTP messages are also aligned on 32-bit boundaries to minimize the cost of manipulation on current machine architectures. Manipulating unaligned multibyte integer quantities on modern machine architectures usually incurs an extra cost ranging from mild to severe compared to manipulating the same quantities in aligned form.

In keeping with other network protocol standards including TCP/IP, multioctet integer quantities in NDTP are preferably encoded using the big endian integer interpretation convention, as set forth above.

To overcome network latency, NDTP is designed to support asynchronous operation, where many requests may be sent to an NDTP server before a response from any of them is received.

Each NDTP message is preceded by a fixed size, 12-octet header, using the preferred data structure:

```
typedef struct ndtp-hdr {
    uint8_T op;          /* opcode */
    uint8_t pad[3];
    uint32_t id;         /* transaction identifier */
    uint32_t size;       /* total request size
                            following the header */
}ndtp_hdr_t;
``` where:

op:
  NDTP message numerical operation code.
  NDTP_GET: get request
  NDTP_GET_RSP: get response
  NDTP_PUT: put request
  NDTP_PUT_RSP: put response
  NDTP_DEL: delete request
  NDTP_DEL_RSP: delete response
  NDTP_RDR_RSP: provide redirection id:
  Client supplied operation request used to distinguish responses from multiple outstanding NDTP asynchronous requests. Each "_RSP" message echoes the id field of the associated request.

size:
  Size, in octets of the remainder of the NDTP message. The size field should always be a multiple of 4 octets.

Variably sized portions of NDTP messages are preferably defined with a size field rather than some other delimiter mechanism to facilitate efficient reading of NDTP messages. Requests may be made to the network layer to read the entire variably sized portion of an NDTP message, rather than reading small chunks while scanning for a delimiter. Furthermore, client and server resource management can be more efficient since the size of NDTP messages is known before reading.

The variably sized portions of NDTP messages are composed of zero or more NDTP stings:

```
typedef struct ndtp_str {
    uint32_t len;
    uint8_t data [ ];
{ ndtp_str_t;
```

Note that the C struct definitions in this document are schematic, and not necessarily fully compliant structures in the C programming language. Specifically, arrays denoted in this document with "[ ]" imply a dimension which is only known dynamically and this indefinite array size specifier is not allowed in C struct definitions. Note also the following:

len:
  the number of significant octets of data following the len field in the data area.

data:
  len octets of data, followed by up to 3 octets of padding, to ensure that the total length of the NDTP string structure is a multiple of 4 octets.
  The padding octets are not included in the len field.

Because variable sized portion NDTP messages are composed of zero or more NDTP stings and NDTP strings preferably occupy an even multiple of 4 octets, this ensures that the "size" field of NDTP message headers will preferably be a multiple of 4 octets.

Protocol Structure

An example of multiple outstanding NDTP requests and the use of request identifiers is shown in FIG. 1. NDTP preferably has a simple, stateless request/response structure. Each request message 10 sent by a client 12 has a corresponding response message 14 returned by the server 16. To maximize server 16 throughput and use of available network bandwidth, NDTP is asynchronous in nature. Many requests 10 from a single client 12 may be outstanding simultaneously, and responses 14 may or may not be returned from the server 16 in the order in which the requests 10 were issued. Each NDTP request 10 contains an NDTP request identifier 18 that is returned in the NDTP response 14 for the associated request 10. An NDTP client 12 uses a unique NDTP request identifier 18 for each NDTP request 10 that is outstanding at the same time to an NDTP server 16 if it wishes to correlate responses with requests.

There are four operations preferably supported by the protocol:
  Add a location association to an identifier.
  Delete a location association from an identifier.
  Get all locations associated with an identifier.
  Provide a redirect instruction to identify an alternative server.

The response to adding a location association to an identifier 18 is a simple acknowledgement. If the location is already associated with the identifier 18, adding the association has no effect, but the request 10 is still acknowledged appropriately. In other words, the NDTP add operation is idempotent. The response to deleting a location association from an identifier 18 is a simple acknowledgement. If the location is not currently associated with the identifier 18, deleting the association has no effect, but the request 10 is still acknowledged appropriately. In other words, the NDTP delete operation is idempotent. The response 14 to getting all locations associated with an identifier 18 is a list of the locations presently associated with an identifier 18. If no locations are currently associated with an identifier 18, a list of length zero is returned.

Message Formats

NDTP messages 10, 14 preferably have a regular structure that consists of a message operation code, followed by a request identifier 18, followed by a string area length (in bytes) 20, followed by zero or more strings 22, as shown in FIG. 2. As those skilled in the art will appreciate, NDTP message formats are preferably independent of the network transport layer used to carry them. NDTP preferably defines mappings of these messages 10, 14 onto TCP and UDP transport layers (described in detail below), but other mappings could also be defined and it is likely that these NDTP message formats would not require change. For example, the notation ROUND4(x) means x, rounded up to the next multiple of 4.

Integer Format

Multibyte integers in NDTP messages are represented in network byte order; using the big-endian convention. In other words, the most significant byte of a multibyte integer is sent first, followed by the remainder of the bytes, in decreasing significance order.

String Format

Strings in NDTP are represented as counted strings, with a 32-bit length field 20, followed by the string data 22, followed by up to 3 bytes of padding 24 to make the total length of the string representation equal to ROUND4(length). This layout is shown diagrammatically in FIG. 2.

NDTP_GET Format

The NDTP_GET message has a message operation code 30 of 0, and a single NDTP string 32 which is the identifier string for which to get associated location strings. This layout is shown diagrammatically in FIG. 3.

NDTP_GET_RSP Format

Figure 4:
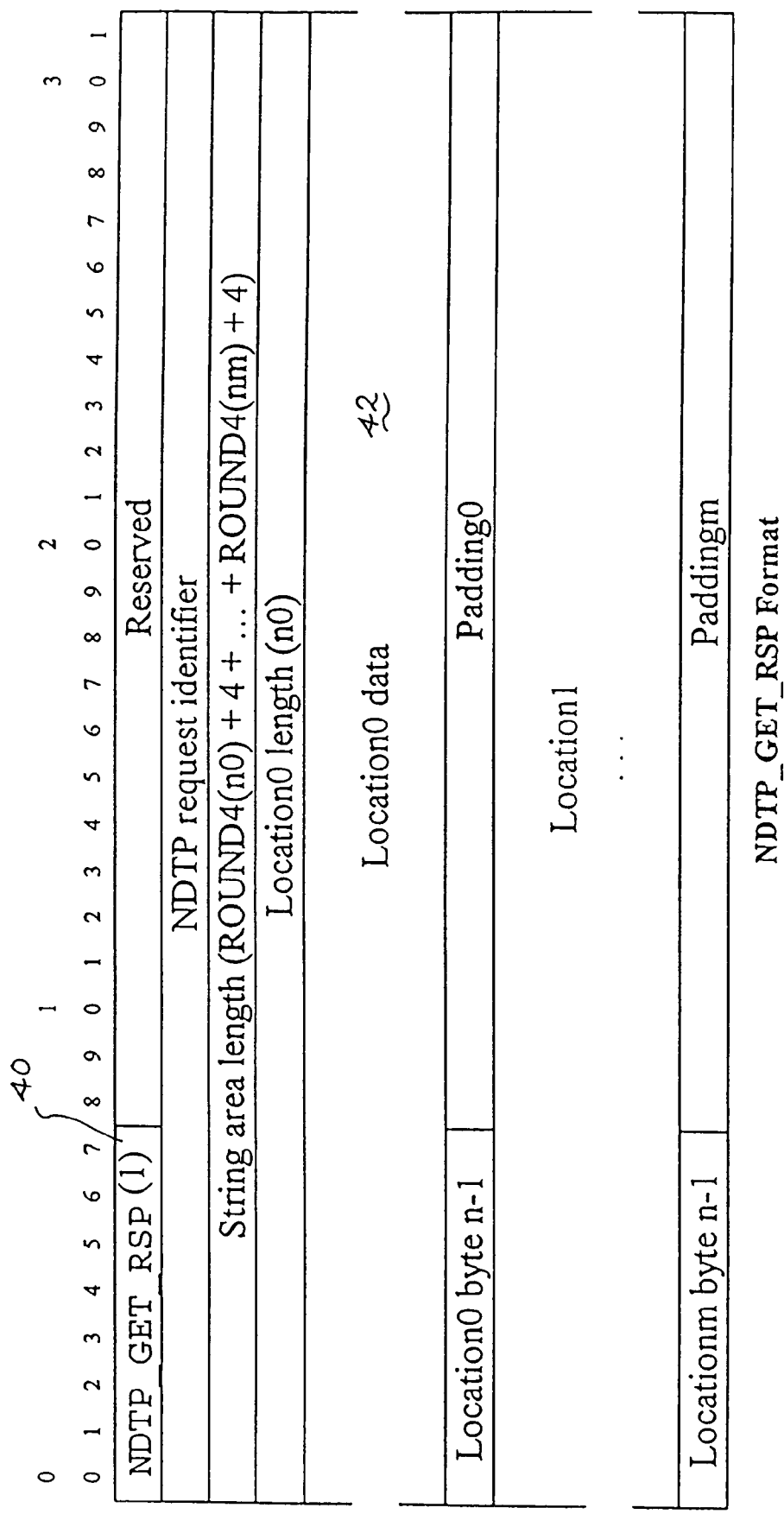
FIG. 4 is a layout of one presently preferred NDTP_GET_RSP message.

The NDTP_GET_RSP message has a message operation code 40 of 1, and zero or more strings 42 that are the locations currently associated with the requested identifier. This layout is shown diagrammatically in FIG. 4.

NDTP_PUT Format

Figure 5:
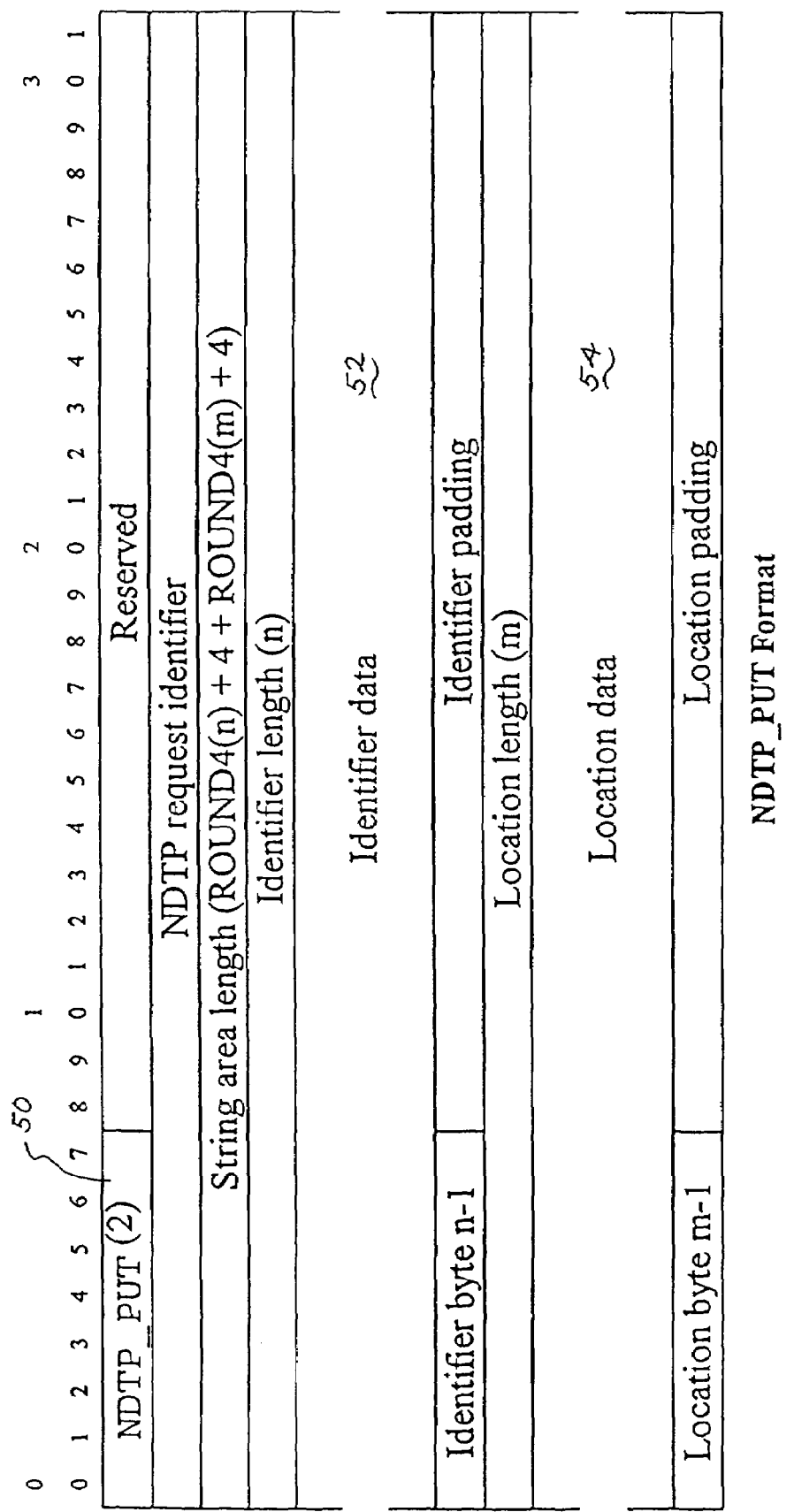
FIG. 5 is a layout of one presently preferred NDTP_PUT message.

The NDTP_PUT message has a message operation code 50 of 2, and two NDTP strings 52, 54. The first string 52 is the identifier for which to add a location association, and the second string 54 is the location to add. This layout is shown diagrammatically in FIG. 5.

NDTP_PUT_RSP Format

Figure 6:
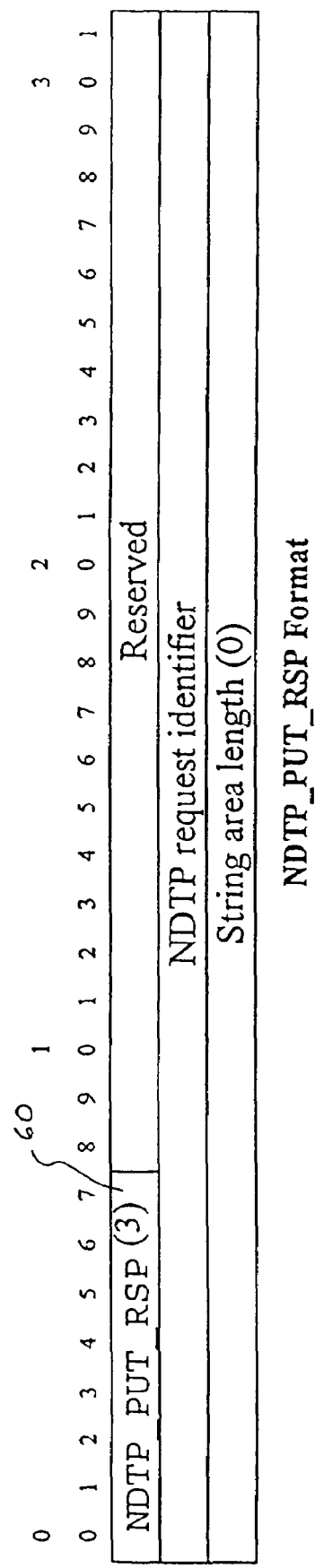
FIG. 6 is a layout of one presently preferred NDTP_PUT_RSP message.

The NDTP_PUT_RSP message has a message operation code 60 of 3, and zero NDTP strings. This layout is shown diagrammatically in FIG. 6.

NDTP_DEL Format

Figure 7:
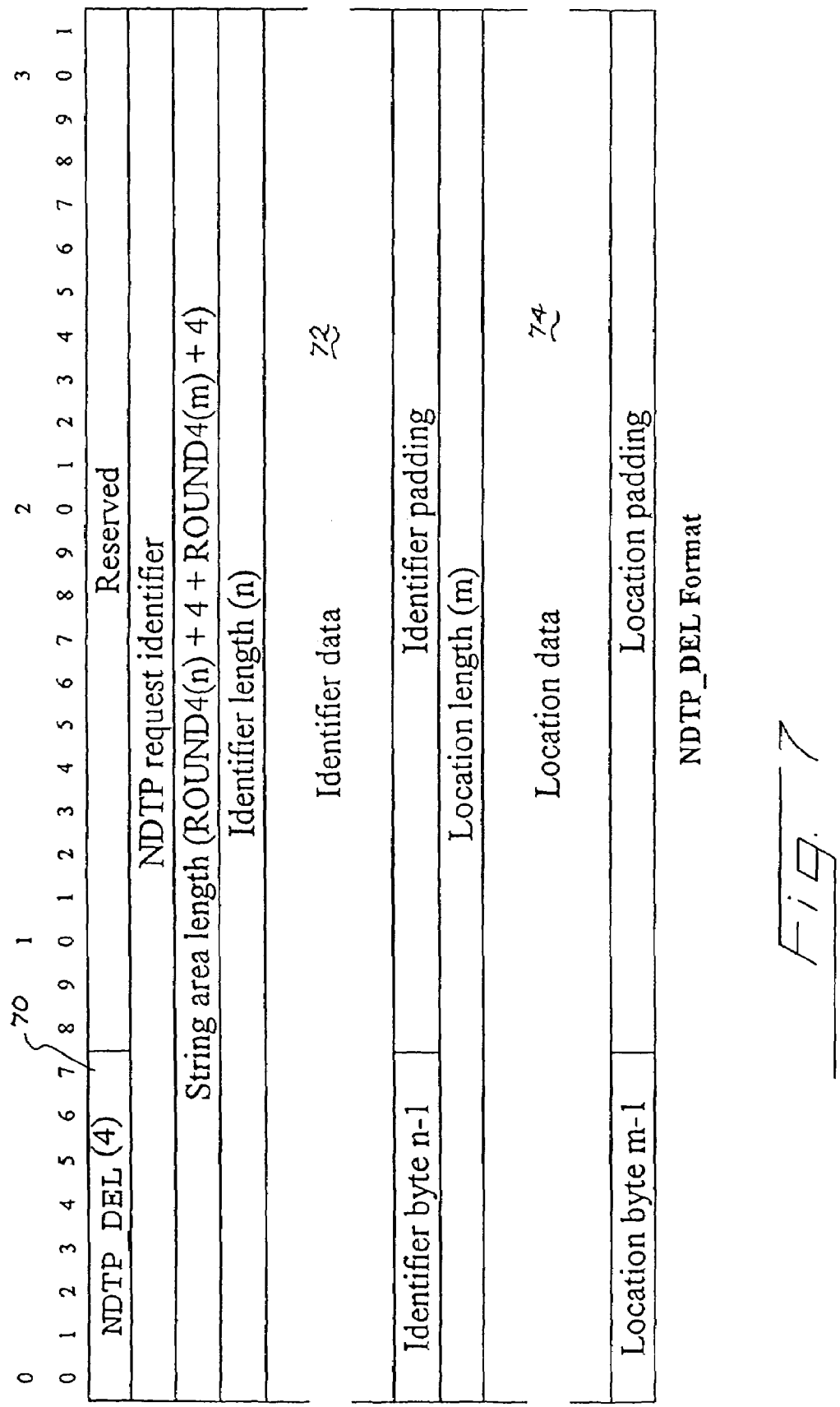
FIG. 7 is a layout of one presently preferred NDTP_DEL message.

The NDTP_DEL message has a message operation code 70 of 4, and two NDTP strings 72, 74. The first string 72 is the identifier from which to delete a location association, and the second string 74 is the location to delete. This layout is shown diagrammatically in FIG. 7.

NDTP_DEL_RSP Format

Figure 8:
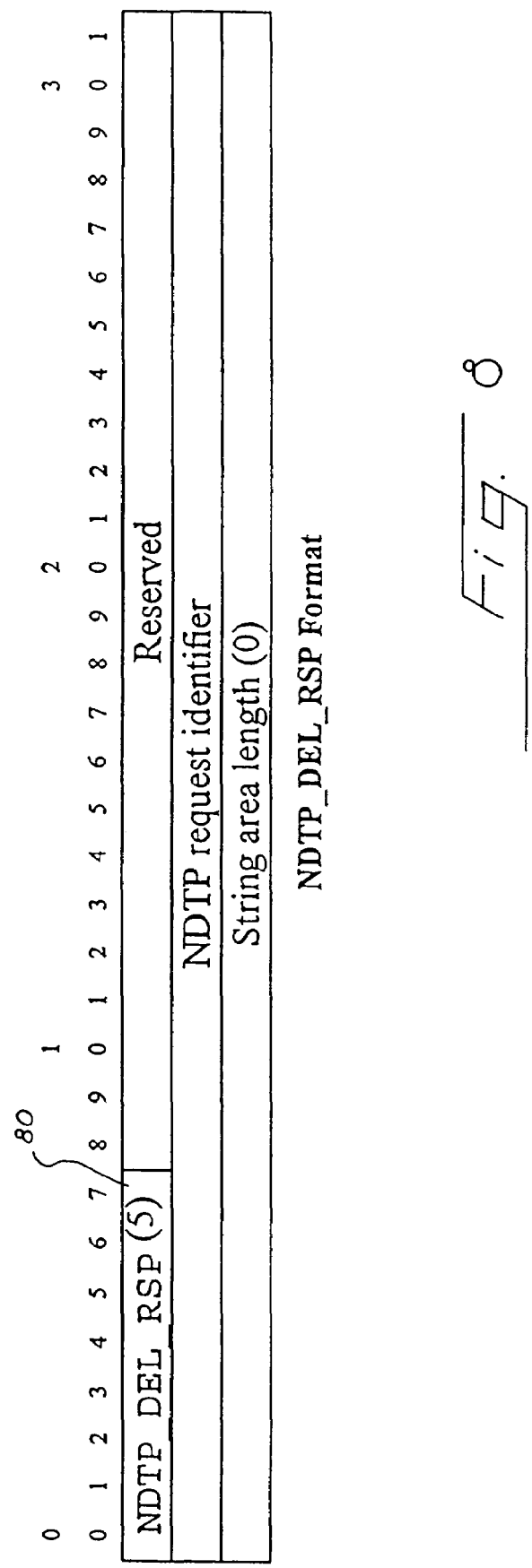
FIG. 8 is a layout of one presently preferred NDTP_DEL_RSP message.

The NDTP_DEL_RSP message has a message operation code 80 of 5, and zero NDTP strings. This layout is shown diagrammatically in FIG. 8.

NDTP_RDR_RSP Format

The NDTP_RDR_RSP message has a message operation code 90 of 6, and one or more NDTP strings 92, 94. Two layouts apply, which are shown diagrammatically in FIGS. 9(*a*) and 9(*b*).

A general description of the usage and operation of these protocol messages is provided below.

NDTP_GET Transaction

The NDTP_GET message contains a single NDTP string which is the entity key for which associated data locations are requested.

```
typedef struct ndtp_get {
    ndtp_hdr_t hdr;
    ndtp_str_t key;
} ndtp_get_t;
```

The NDTP_GET_RSP message contains zero or more NDTP strings which are the data location specifiers associated with the NDTP entity key:

```
typedef struct ndtp_get_rsp {
    ndtp_hdr_t hdr;
    uint32_t rsps;
    ndtp_str_t values[ ];
} ndtp_get_rsp_t;
```

NDTP_PUT Transaction

The NDTP_PUT messages contains two NDTP strings which are (1) the NDTP entity key and (2) the NDTP data location specifier which is to be associated with the NDTP entity key.

```
typedef struct ndtp_put {
    ndtp_hdr_t hdr;
    ndtp_str_t key;
    ndtp_str_t data;
} ndtp_put_t;
```

The NDTP_PUT_RSP message has no NDTP strings, and simply indicates that the requested entity key/data location specifier association was added:

```
typedef struct ndtp_put_rsp {
    ndtp_hdr_t hdr;
} ndtp_put_rsp_t;
```

The requested entity key/data location specifier association is added in addition to any other associations already maintained by the NDTP server. If the requested entity key/data location specifier association is already in effect, the NDTP_PUT still succeeds and results in an NDTP_PUT_RSP message.

NDTP_DELETE Transaction

The NDTP_DEL message contains two NDTP strings which are (1) the NDTP entity key and (2) the NDTP data location specifier which is to be unassociated with the NDTP entity key:

```
typedef struct ndtp_del {
    ndtp_hdr_t hdr;
    ndtp_str_t key;
    ndtp_str_t data;
} ndtp_del_t;
```

The NDTP_DEL_RSP message has no NDTP strings, and simply indicates that the requested entity key/data location specifier association was deleted.

```
typedef struct ndtp_del_rsp {
    ndtp_hdr_t hdr;
} ndtp_del_rsp_t;
```

If the requested entity key/data location specifier association is not in effect, the NDTP_DEL still succeeds and results in an NDTP_DEL_RSP message.

NDTP_RDR_RSP Message

NDTP supports a distributed server implementation for which two principle redirection methods apply: (1) embedded redirection links, and (2) passed functions. The passed functions method in turn has two variants: (a) a well-known function, and (b) a communicated function. (These methods and variants are described in further detail below.)

Network Front End

The NDTP server network front end preferably maximizes NDTP transaction throughput including concurrent NDTP requests from a single client as well NDTP requests from multiple concurrent clients.

Network Communication Mechanism

NDTP defines a transaction oriented protocol, which can be carried over any of a variety of lower level network transport protocols. For example:

TCP/IP: TCP/IP provides a ubiquitously implemented transport which works effectively on both local area and wide area networks. An NDTP client using TCP/IP preferably connects with the NDTP server at an established TCP port number, and then simply writes NDTP request messages through the TCP/IP connection to the server, which then writes NDTP response messages back to the client through the same TCP/IP connection in the reverse direction. TCP/IP implementations perform buffering and aggregation of many small messages into larger datagrams, which are carried more efficiently through the network infrastructure. Running NDTP on top of TCP/IP will take advantage of this behavior when the NDTP client is performing many NDTP requests. For example, a data repository which is undergoing rapid addition of data records associated with various entities will perform many rapid NDTP_PUT operations to the NDTP server that can all be carried on the same NDTP TCP/IP connection.

UDP/IP: If an NDTP client only performs occasional, isolated NDTP operations, or there are a vast number of clients communicating with an NDTP server, TCP/IP will not offer the best possible performance because many traversals of the network are required to establish a TCP/IP connection, and yet more network traversals are required to transfer actual NDTP messages themselves. For such isolated NDTP transactions, depending upon the application and network infrastructure in use, it is beneficial to have the NDTP server employ UDP/IP, which is a widely available connectionless datagram protocol.

However, UDP/IP does not support reliable data transfer, or any congestion control mechanism. This means that NDTP clients using UDP/IP must implement reliability and congestion control maintaining transaction timeouts and performing exponential retry backoff timers, precisely analogous to the congestion control mechanism implemented by Ethernet, and other well known UDP protocols. Those skilled in the art will note that the NDTP protocol is stateless from the standpoint of the NDTP server, which means that there is no congestion control or reliability burden on the server; it is all implemented in a distributed manner by the NDTP UDP/IP clients.

Still Higher Performance (ST): Both TCP/IP and to a lesser degree UDP/IP suffer from high host CPU overhead. Like the relatively long latency of TCP/IP, this host CPU consumption is considered just the "cost of doing business" where TCP/IP provides ubiquitous connectivity. If an NDTP server were running in a more constrained environment, where ubiquitous connectivity was not required, its absolute performance could be improved substantially by using a different protocol that is optimized to reduce CPU overhead and latency, such as the Scheduled Transfer (St) protocol.

None of these network implementation issues are particularly unique to NDTP, however. All similar protocols face similar tradeoffs, and what art exists to improve the performance of such protocols applies fully to NDTP as well.

NDTP Query Processing

Servicing NDTP query requests does not require high latency operations, such as disk I/O. Therefore, the NDTP server network front end preferably services NDTP query requests in a FIFO style by reading the NDTP_GET message, performing the lookup for the entity key in the NDTP server string store, and writing the NDTP_GET_RSP message. Each NDTP query is independent of any other NDTP transactions (other queries or updates), so it is possible to process multiple NDTP queries simultaneously on multiprocessor machines. The NDTP server permits this by not performing multiprocessor locking in the NDTP query processing path.

The current prototype NDTP server preferably does not create multiple read service threads per NDTP connection, so multiprocessing will only occur while processing queries from different NDTP connections. Nonetheless, the NDTP server could be extended to support multiprocessing of NDTP queries from a single NDTP connection if this turned out to be advantageous.

NDTP Update Processing

Unlike NDTP queries, processing NDTP updates requires the high latency operation of committing the change to non-volatile storage. To maintain high performance on NDTP updates, the NDTP server network front end preferably supports multiple concurrent asynchronous update transactions. Also, each update is preferably performed atomically to avoid creating an inconsistent state in the string store. Currently, the string store supports only a single mutator thread, which means that all NDTP updates are serialized through the string store mutator critical code sections. As is traditional in transactional systems, the string store mutation mechanism is implemented as a split transaction.

When an NDTP update is processed, a call is made to the string store mutation function, which returns immediately indicating either that the mutation is complete, or that the completion will be signaled asynchronously through a callback mechanism. The mutator function might indicate an immediate completion on an NDTP_PUT operation if the entity key/data location specifier mapping was already present in the database. In this case, the network front end will immediately write the update response message back to the client.

For updates which are not immediately completed, the network front end maintains a queue of NDTP updates for which it is awaiting completion. When the completion callback is called by the string store log file update mechanism, the network front end writes the NDTP update response messages for all completed updates back to the clients. If no new NDTP update requests are arriving from NDTP clients, and there are some incomplete updates in the update queue, the network front end preferably calls the string store log buffer flush function to precipitate the completion of the incomplete updates in update queue.

Multiple Connection Handling

Handling multiple clients in a single server process requires that the server process not block waiting for events from a single client, such as newly received data forming an NDTP request message, or clearing a network output buffer so an NDTP response message can be written. The NDTP server network front end may be conditionally compiled to use either of two standard synchronous I/O multiplexing mechanisms, select or poll, or to use threads to prevent blocking the server waiting for events on individual connections. The select and poll interfaces are basically similar in their nature, but different in the details. When compiled for synchronous I/O multiplexing, the NDTP server network front end maintains an input buffer for each connection. The multiplexing function is called to determine if any of the connections have input available, and if so, it is read into the connection's input buffer. Once a complete NDTP request is in the buffer, it is acted upon. Similarly, the network front end maintains an output buffer for each connection, and if there is still a portion of an NDTP response message to send, and the connection has some output buffer available, more of the NDTP response message is sent.

The threaded version of the NDTP server network front end preferably creates two threads for each NDTP connection, one for reading and one for writing. While individual threads may block as input data or output buffer is no longer available on a connection, the thread scheduling mechanism ensures that if any of the threads can run, they will. The threaded version of the NDTP server is most likely to offer best performance on modern operating systems, since it will permit multiple processors of a system to be used, and the thread scheduling algorithms tend to be more efficient than the synchronous I/O multiplexing interfaces. Nonetheless, the synchronous I/O multiplexing versions of NDTP server will permit it to run on operating systems with poor or non-existent thread support.

A more detailed description of the mapping operation in both a TCP and UDP environment appears below.

TCP Mapping

As those skilled in the art will appreciate, the Transmission Control Protocol (TCP) is a connection-oriented protocol that is part of a universally implemented subset of the Internet Protocol (IP) suite. TCP provides reliable, bi-directional stream data transfer. TCP also implements adaptive congestion avoidance to ensure data transfer across a heterogeneous network with various link speeds and traffic levels.

NDTP is preferably carried on TCP in the natural way. An NDTP/TCP client opens a connection with a server on a well-known port. (The well-known TCP (and UDP) port numbers can be selected arbitrarily by the initial NDTP implementer. Port numbers that do not conflict with existing protocols should preferably be chosen.) The client sends NDTP requests 10 to the server 16 on the TCP connection, and receives responses 14 back on the same connection. While it is permissible for a single client 12 to open multiple NDTP/TCP connections to the same server 16, this practice is discouraged to preserve relatively limited connection resources on the NDTP server 16. The asynchronous nature of NDTP should make it unnecessary for a client 12 to open multiple NDTP/TCP connections to a single server 16.

If protocol errors are detected on an NDTP/TCP connection, the NDTP/TCP connection should be closed immediately. If further NDTP/TCP communication is required after an error has occurred, a new NDTP/TCP connection should be opened. Some examples of detectable protocol errors include:

Illegal NDTP message operation code;
Nonzero String Area Length in NDTP_PUT_RSP or NDTP_GET_RSP;
Inconsistent String Area Length and String Length(s) in NDTP_GET, NDTP_GET_RSP, NDTP_PUT or NDTP_DEL;
Unexpected NDTP request identifier by client.

Due to the reliable nature of TCP, NDTP/TCP servers 16 and clients 12 need not maintain any additional form of operation timeout. The only transport errors that can occur will result in gross connection level errors. A client 12 should assume that any NDTP requests 10 for which it has not received responses 14 have not been completed. Incomplete operations may be retried. However, whether unacknowledged NDTP requests 10 have actually been completed is implementation dependent. Any partially received NDTP messages should also be ignored.

UDP Mapping

As those skilled in the art will appreciate, the Unreliable Datagram Protocol (UDP) is a best-effort datagram protocol that, like TCP, is also part of the universally implemented subset of the IP suite. UDP provides connectionless, unacknowledged datagram transmission. The minimal protocol overhead associated with UDP can deliver extremely high performance if used properly.

NDTP/UDP clients 12 send UDP datagrams with NDTP request messages 10 to a well-known UDP port (see above). NDTP/UDP servers 16 return NDTP response messages 14 to the client 12 selected local UDP port indicated in the NDTP/UDP datagram containing the requests 10. NDTP/UDP does not require any form of connection or other association to be established in advance. An NDTP interchange begins simply with the client request message 10.

For efficiency, the mapping of NDTP on to UDP permits multiple NDTP messages to be sent in a single UDP datagram. UDP datagrams encode the length of their payload, so when a UDP datagram is received, the exact payload length is available. The recipient of an NDTP/UDP datagram will read NDTP messages from the beginning of the UDP datagram payload until the payload is exhausted. Thus, a sender of an NDTP/UDP datagram is free to pack as many NDTP messages as will fit in a UDP datagram.

The largest possible UDP datagram payload is presently slightly smaller than 64K bytes. In addition, there may be a performance penalty sending UDP datagrams that are larger than the maximum datagram size allowed by the physical network links between the sender and intended recipient. IP provides mechanisms for discovering this maximum transfer size, called the Path Maximum Transfer Unit (Path MTU), but a discussion of these mechanisms is beyond the scope of this specification. An implementation of NDTP/UDP should preferably respect these datagram size limitations.

Unlike TCP, UDP does not provide reliable data delivery. Therefore, an NDTP/UDP client 12 implementation should implement a timeout mechanism to await the response for each outstanding NDTP request 10. The exact duration of this response timer is implementation dependent, and may be set adaptively as a client 12 receives responses from a server 16, but a reasonable default maximum value is preferably 60 seconds. If a response 14 is not received within the response timeout, the client 12 may retransmit the request 10. NDTP/UDP servers 16 need not maintain any timeout mechanisms.

Depending upon the exact timeout values selected, the client 12 retry mechanism may place some requirements on a client's 12 use of the NDTP request identifier 18 field. If the response timer is shorter than the maximum lifetime of a datagram in the network, it is possible that a delayed response will arrive after the response timer for the associated request has expired. An NDTP/UDP client 12 implementation should ensure that this delayed response is not mistaken for a response to a different active NDTP request 10. Distinguishing current responses from delayed ones is called antialiasing. One presently preferred way to perform antialiasing in NDTP/UDP is to ensure that NDTP request identifier 18 values are not reused more frequently than the maximum datagram lifetime.

NDTP/UDP client 12 implementations that use the NDTP request identifier 18 for antialiasing should ignore (i.e., skip) NDTP messages within a NDTP/UDP datagram with invalid NDTP request identifier 18 values. Client 12 or server 16 NDTP/UDP implementations detecting any other protocol error should also preferably discard the remainder of the current NDTP/UDP datagram without processing any further NDTP requests from that datagram. Some examples of such detectable errors include:

Illegal NDTP message operation code;

Nonzero String Area Length in NDTP_PUT_RSP or NDTP_GET_RSP;

Inconsistent String Area Length and String Length(s) in NDTP_GET, NDTP_GET_RSP, NDTP_PUT or NDTP_DEL;

Inconsistent NDTP message length and UDP datagram length.

Because NDTP/UDP messages are limited to the length of a single UDP datagram payload, NDTP/UDP cannot be used to transfer long NDTP messages. For example, it would be very difficult to send an NDTP_GET message with NDTP/UDP for a 64K byte identifier string. This case is avoidable by a client 12 realizing that an NDTP message is too long to send as a UDP datagram and using NDTP/TCP instead. However, a greater limitation is that NDTP currently provides no mechanism for an NDTP server 16 to indicate that a response is too large to fit in a UDP datagram. In this case, the NDTP server 16 should not send a response 14, and it may or may not chose to complete the request 10. The recovery mechanism in this case preferably is, after several unsuccessful attempts to use NDTP/UDP, a client 12 may try again with NDTP/TCP.

Because UDP does not provide any form of congestion avoidance it is possible that the simple retry strategy specified for NDTP/UDP can create network congestion. Network congestion can cause a severe degradation in the successful delivery of all network traffic (not just NDTP traffic, nor just the traffic from the particular client/server 12, 16 pair) through a congested network link. Congestion will occur when an NDTP/UDP implementation is sending datagrams faster than can be accommodated through a network link. Sending a large number of NDTP/UDP datagrams all at once is the most likely way to trigger such congestion. Sending a single NDTP/UDP datagram, assuming it is smaller than the Path MTU, and then waiting for a response 14 is unlikely to create congestion. Therefore, the use of NDTP/UDP should be confined to contexts where clients 12 send few outstanding requests at a time, or where network congestion is avoided through network engineering techniques.

Those skilled in the art will appreciate that network congestion is a highly dynamic property that is a function of network traffic from all sources through a network link and will vary over time over any given network path. An NDTP/UDP client 12 implementation can recover from network congestion by switching to NDTP/TCP after several failed retries using NDTP/UPD. Failure due to network congestion may be indistinguishable from failure due to UDP packet size limitations, but since the recovery strategy is the same in both cases, there is no need to distinguish these cases.

NDTP/UDP Congestion Avoidance

Given the stateless, transactional nature of NDTP, NDTP/UDP generally performs much better than NDTP/TCP. This performance improvement is measurable both in terms of the maximum sustainable transaction rate of an NDTP server 16, and the latency of a single response to an NDTP client 12. In the same way as the Domain Name Service (DNS), NDTP fits naturally in the UDP model. It is a working assumption of NDTP (and DNS) that for every NDTP transfer, there will be an associated transfer of real data that is an order of magnitude or more greater in size than the NDTP protocol traffic. This property will naturally limit the amount of NDTP traffic on a network. However, in applications where NDTP traffic reaches high levels, particularly at network 'choke points' which are not within the control of network engineers, it may be desirable to support a congestion avoidance mechanism for NDTP/UDP.

However, those skilled in the art will appreciate that the other main future requirement of NDTP, security (described below), implies an existing, durable association between NDTP clients 12 and NDTP servers 16. This association is much like (and in the case of SSL, it is) a network connection. Therefore, depending upon what security technology is applied, developing a congestion avoidance mechanism for NDTP/UDP may be an irrelevant exercise.

Server Redirection Mechanism

NDTP provides two mechanisms for server redirection. The redirection mechanisms allow cluster and hierarchical topologies, and mixtures of such topologies (described in detail below). The first redirection mechanism supported by NDTP, embedded redirection links, uses an application specific convention to return redirection pointers as NDTP data location strings. For example, if location strings are W3C URLs, a URL with the schema ndtp: could be a server indirection pointer. An NDTP_GET_RSP message may contain any mixture of real data location strings and NDTP server redirection pointers. In this case, the client must issue the same NDPT_GET query message to other NDTP servers indicated by the redirection pointers. The total set of data location strings associated with the supplied identifier string is the collection of all the data location strings returned from all the NDTP servers queried. The embedded redirection link technique does not require any specific NDTP protocol support. Therefore, it could be used within the NDTP protocol as is, and does not require further description in this specification.

The second redirection mechanism, which is specified as a future extension of NDTP, is having the server return an NDTP_RDR_RSP message in response to an NDTP request for which the NDTP server has no ownership of the supplied identifier string. Those skilled in the art will note that unlike the embedded redirection links mechanism, the NDTP_RDR_RSP mechanism applies to all NDTP requests, not just NDTP_GET.

Figure 9A:
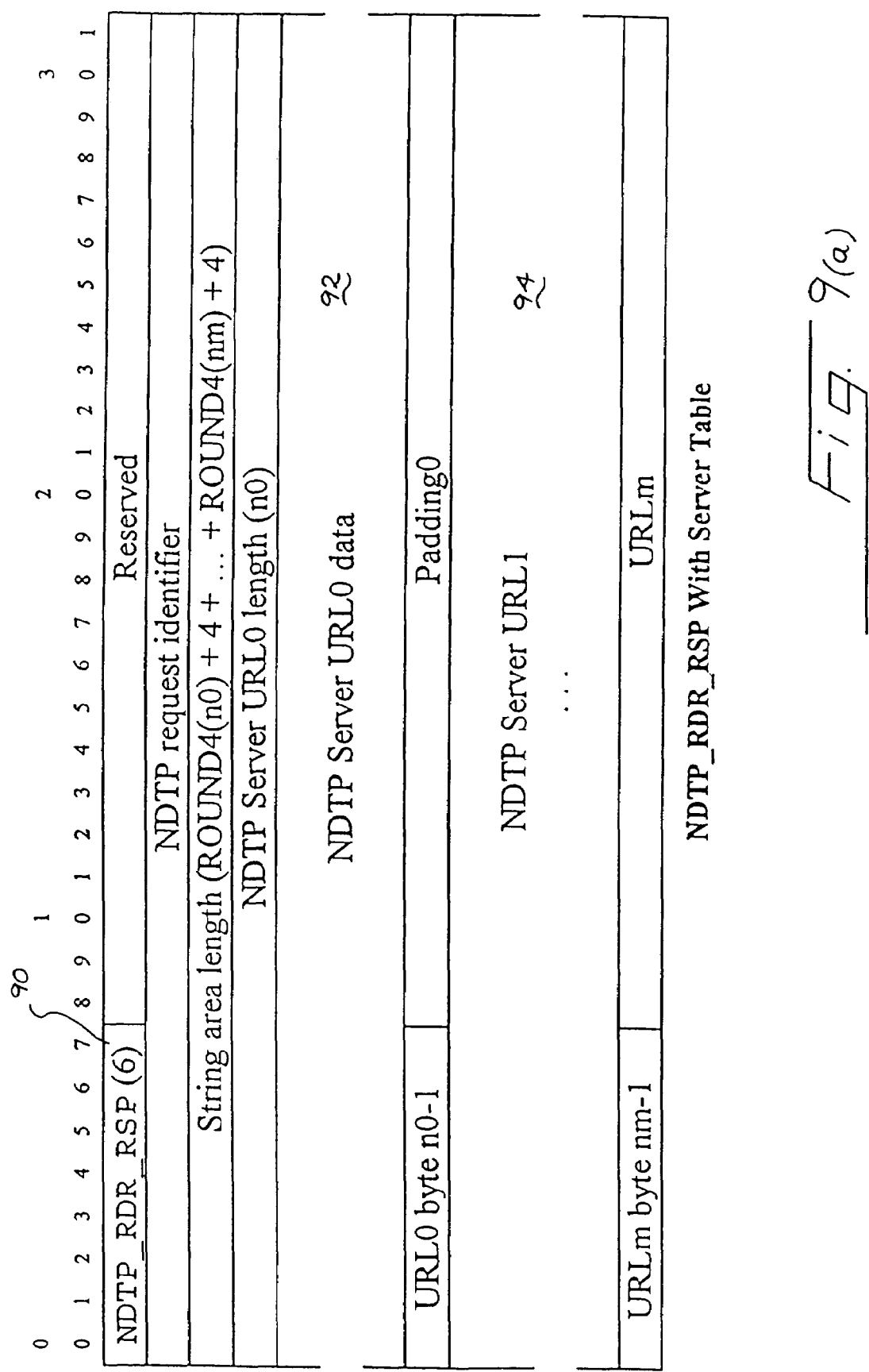
FIG. 9(a) shows a server table layout.

As mentioned above, the second redirection mechanism has two variants. The first variant of the NDTP_RDR_RSP function mechanism specifies a well-known function that all NDTP server and client implementations know when they are programmed, and the NDTP_RDR_RSP message carries a table of NDTP server URLs. The format of the NDTP_RDR_RSP message with an NDTP server URL table is shown in FIG. 9(a).

The appropriate NDTP server is selected from the table in the NDTP_RDR_RSP message by applying a well-known function to the identifier string and using the function result as an index into the NDTP server table. The well-known function preferably applied is the hashpjw function presented by Aho, Sethi and Ullman in their text *Compilers, Principles, Techniques and Tools*:

```
uint32_t
hash (uint8_t *s, uint32_t slen, uint32_t size)
{
  uint32_t g;
  uint32_t i;
    unit32_t h = 0;
  uint8_t c;
  for (i = 0; i < slen; i++) {
    c = s[i];
    h = (h << 4) + c;
    g = (h & 0xf0000000);
    if (g) {
      h ^= g >> 24;
      h ^= g;
    }
  }
  return h % size;
}
```

In this case, the size parameter is the number of elements in the NDTP server URL table returned in the NDTP_RDR_RSP message. For the hashpjw function to behave correctly, the size parameter must be a prime number, therefore the NDTP server URL table must also have a prime number of elements. Those skilled in the art will appreciate that the same NDTP server may appear multiple times in the NDTP server URL table. For example, if the server URL table has 2039 elements, by putting one NDTP server URL in the first 1019 table elements, and a second NDTP server URL in the second 1020 table elements, the responsibility for the index string space will be split roughly in half.

The second variant of the NDTP_RDR_RSP function mechanism specifies that a general function description will be sent to the NDTP client in the NDTP_RDR_RSP message. The NDTP client will apply this function to the identifier string and the output of the function will be the NDTP server URL to which to send NDTP requests for the particular identifier string. The advantage of this technique over the well-know function approach is that it allows application-specific partitions of the identifier string space. This can permit useful administrative control. For example, if General Electric manages all identifiers beginning with the prefix "GE", a general function can be used to make this selection appropriately. The disadvantage of using a general function is it may be less efficient to compute than a well-known function.

There are a variety of possible mechanisms for sending function descriptions. NDTP is expected to be applied in environments that make extensive use of the Java programming platform. Therefore the NDTP_RDR_RSP mechanism preferably uses a feature of the Java programming language called "serialized representation" to communicate generalized functions in the NDTP_RDR_RSP message. A serialized form of a Java object is a stream of bytes that represents the precise state of the object, including its executable methods. For example, the Java Remote Method Invocation (RMI) mechanism uses serialized objects to send executable code to a remote platform for execution. The NDTP_RDR_RSP message contains the serialized form of an object implementing this Java interface:

```
interface NDTPRedirectFunction {
    String selectServer(byte[ ] identifier);
}
```

Figure 9B:
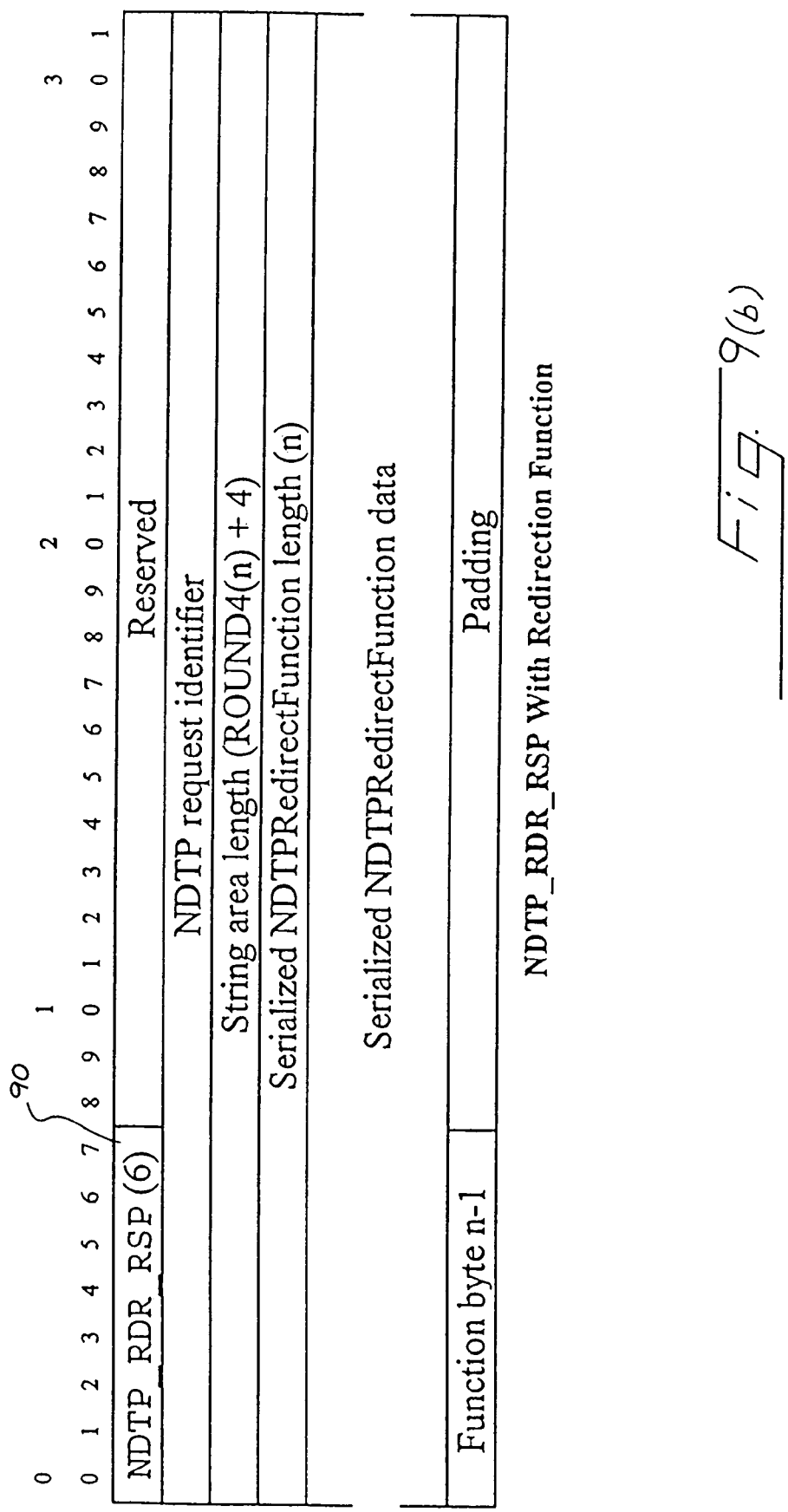
FIG. 9(b) shows a redirection function layout.

The format of the NDTP_RDR_RSP message with a Java Serialized form of the NDTP redirection function is specifically identified in FIG. 9(b).

The NDTP server redirection mechanism also permits construction of NDTP server clusters (described below). It is expected that the identifier string hash function will be defined at the time NDTP is implemented, but the actual list of NDTP servers 90 will change from application to application and within a single application throughout the lifetime of the system. Therefore, it is necessary for clients to be able to discover updated NDTP server lists, and any other relevant dynamic parameters of the server selection function as these inputs change.

Hierarchical Server Topology

While the NDTP server topology supported by the server redirection mechanism described above and shown in FIGS. 9(a) and 9(b) is an extremely powerful and general scaling technique, suitable for diverse topology deployments, some applications might still benefit from a specifically hierarchical server topology. An NDTP server hierarchy 100, such as that shown in FIG. 10, permits identifier/location association data to be owned and physically controlled by many different entities. An NDTP server cluster should be managed by a single administrative entity 102, and the distribution of data can be for performance and scaling purposes. Furthermore, a server hierarchy would provide some fault isolation so portions of the identifier/location association data can be accessed and updated in the presence of failures of some NDTP servers 104. Finally, an NDTP server hierarchy can localize NDTP update operations (NDTP_PUT and NDTP_DEL), which can improve performance and reduce network load.

A hierarchical NDTP server topology also allows organizations to maintain their own local NDTP server 104 or NDTP server cluster 102 that manages associations to data locations that are within the organizations' control. Upper tier NDTP servers 108 would be used to link the various leaf NDTP servers 104.

Server Constellations

Figure 10:
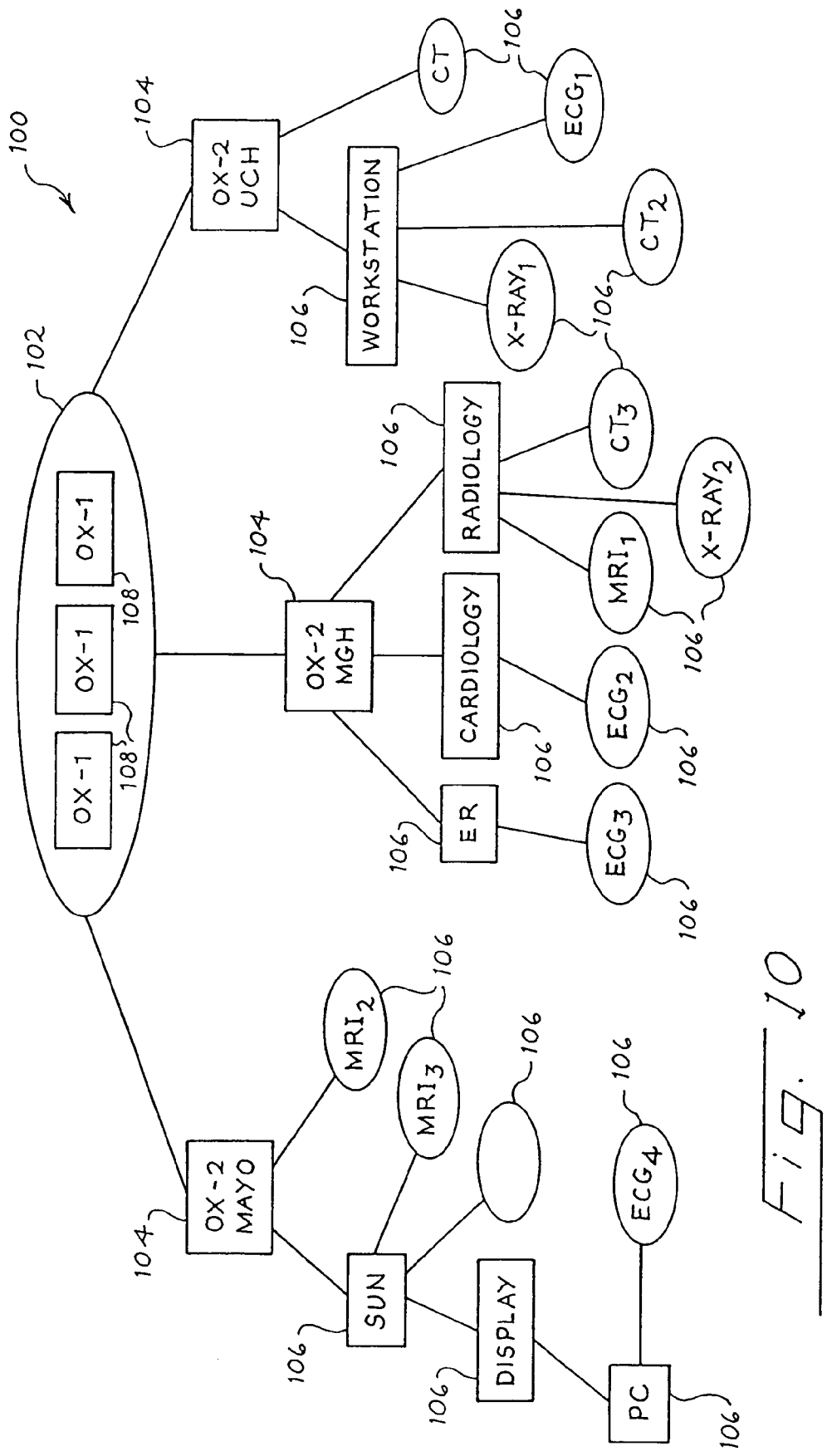
FIG. 10 is a system block diagram showing a multi-server implementation environment of the network distributed tracking wire transfer protocol of the invention.

The NDTP server organization also allows NDTP servers to be combined in various ways to build server constellations that offer arbitrary server performance scalability and administrative control of the location of portions of the identifier/data location relationship mappings. FIG. 11 illustrates an NDTP server constellation 110 as it relates to a client 112 and a data repository 114. In FIG. 10, the client 112 and data repository 114 of FIG. 11 were merged into the single client entity 106 for ease of discussion. Their distinction can now be separated and identified in order to illustrate the storage and retrieval of data in a distributed data collection.

As shown in FIG. 11, a client 112 consults the server constellation 110, which may be construed in either of two forms (see FIGS. 12 and 13), and which returns location strings in response to a client 112 request. Once the client 112 has the location string for a particular unit of data, the client 112 contacts and retrieves information directly from the data repository 114. In one embodiment, if the client 112 contains a data repository 114, internal application logic would facilitate this interaction. Those skilled in the art will appreciate that the term "data collection" is being employed rather than the term "database" because database frequently invokes images of Relational Database Systems (which is only one application of the protocol); an NDTP data collection could just as easily be routing tables as it could be files or records in a RDBS database.

NDTP server constellations 110 preferably have two basic organizational paradigms: Client-Centric and Server-Centric. NDTP supports both by design, and both approaches apply to all aspects of managing the relationships between identifiers and locations, such as data retrieval, index manipulation, and server redirection. Each will be discussed separately below.

Client-Centric Approach

The first basic pattern that NDTP supports is driven by the client 112, and can be called "client-centric". Referring to FIG. 12, a single client (not shown) asks a server 120a in the server constellation 110 for operations that the client desires executed (represented by arrow 1 in FIG. 12). If the client doesn't receive the data requested, it will receive a redirection response message (NDTP_RDR_RSP) from the contacted server 120a (arrow 2). The client then uses the information it receives to ask another server 120b for the operations the client wants to initiate (arrow 3). A successful response from the second server 120b is then sent to the client (arrow 4).

This design constructs operating patterns for (1) redirection, (2) index operations, and (3) hierarchical or cluster topologies. The important point is that the Network Distributed Tracking Protocol is designed to support highly configurable methods for processing index-related operations.

NDTP supports two specific redirection mechanisms, which are not mutually exclusive and may be combined in any way within a single NDTP server constellation 110. This formation may increase performance when many clients (not shown) participate, since client processing is emphasized rather than server processing. The first NDTP redirection mechanism uses a distinctively encoded location string for each NDTP server 120a,b that contains additional location strings associated with the identifier string supplied in the NDTP request 122a,b. This is an embedded redirection link. For example, if location strings are some form of HTTP URL, a URL with the schema specifier ndtp: would indicate a redirection. Using this scheme, the location strings associated with an identifier string may be spread among multiple NDTP servers 120a,b. In addition to redirection, in FIG. 12, all index manipulation operations continue to apply, but they are directed at the correct NDTP server 110b for which they apply: NDTP_GET, NDTP_PUT, NDTP_DEL.

The second NDTP redirection mechanism uses a NDTP_RDR_RSP message to indicate that the server 120a to which the NDTP request 122a was directed does not contain any of the location strings associated with the identifier string supplied in the NDTP request 122a. The NDTP_RDR_RSP message contains all the information required for the originator of the NDTP request 122a to reissue the original NDTP request 122b to a different NDTP server 120b that does have location strings associated with the identifier string supplied in the NDTP request 122b. This information may be an array of NDTP server hosts from which one is selected by applying a well-known function to the identifier string supplied in the NDTP request 122b, or the communicated function to apply as well as a list or other description of the NDTP server hosts from which to choose, as described above.

FIG. 12 illustrates a cluster topology for client interaction with NDTP servers 120. A single client queries a first server 120a (Server0), learns of a new index location (Server1), and then contacts that server 120b (Server1) for the operations it wishes to execute on the index that the client identifies. The basic idea is that a client asks a server 120a to process an index operation. If the contacted server 120a does not have all the information, as for example in a redirect, then it passes the request to another server 120b. If the second server 120b is appropriate it responds appropriately, or it passes the request on to another server (not shown), and so on. FIG. 12 could also illustrate a hierarchical topology if a client (not shown) contacted another client in a handoff as shown in FIG. 10, where a client 106 "asks up" to another client 106, and so on.

Behind the scenes, the server constellation 110 could also be using a hierarchical organization or a cluster organization for managing indices. The important point of this topology is pushing processing emphasis toward clients (not shown) rather than toward servers 120a,b. Such protocol design has scale implications as the number of participating machines/mechanisms increases, since it distributes aggregate processing.

Server-Centric Approach

Figure 13:
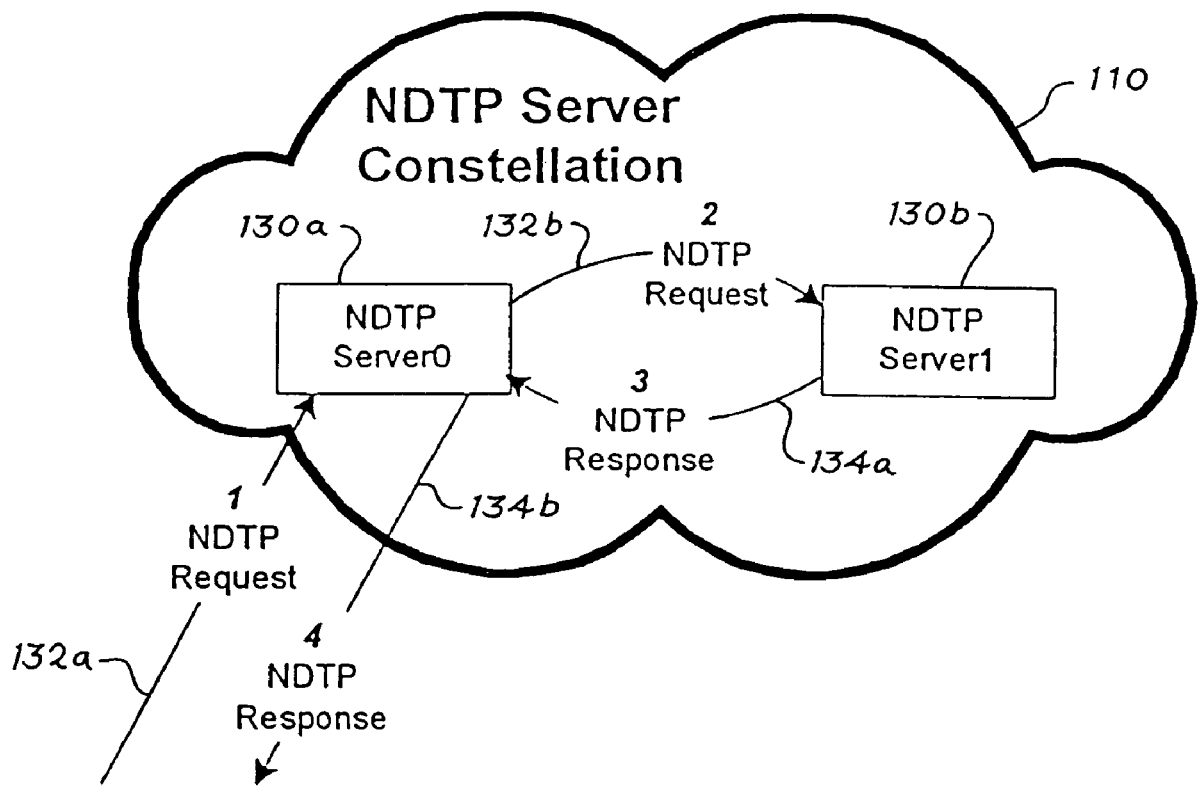
FIG. 13 is a system diagram showing a server-centric constellation approach.

The second basic pattern that the Network Distributed Tracking Protocol provides is a "Server-Centric Approach". FIG. 13 shows the server constellation 110 characterizing "server-centric" functionality. In this figure, an NDTP server 130a (Server0) receives a request 132a from a client (not shown). The server 130a (Server0) passes the request to a second server 130b (Server1), which is an appropriate server for the process, and the second server 130b returns a response 134a to the first server 130a (Server0). If the second server 130a (Server1) was not appropriate, it could pass the request to another server (not shown), and so on. Each NDTP server 130a,b will combine the results of NDTP requests 132a,b it has performed of other NDTP servers 130a,b with whatever responses 134a,b it generates locally for the original NDTP request 132a, and the combined response 134b will be the appropriate response for the original NDTP request 132a.

This design constructs operating patterns for (1) index operations and (2) hierarchical or cluster topologies. The important point is that the Network Distributed Tracking Protocol is designed to support highly configurable methods for processing index-related operations, but this method emphasizes server-processing rather than client-processing. In FIG. 13, all index manipulation operations continue to apply, but they are directed at the correct NDTP server 130a,b for which they apply: NDTP_GET, NDTP_PUT, NDTP_DEL.

FIG. 13 illustrates an hierarchical topology for client interaction with NDTP servers 130. A single client queries a first server 130a (Server0), which is not appropriate, and so the first server 130a (not the client) itself contacts an appropriate server 130b (Server1) for operations it "passes through" to execute on the index that the client has identified. Alternatively, FIG. 13 could illustrate a cluster topology if a server 130a contacted another server 130b in a what is known as a "peer" handoff. The important point of this topology is that it pushes processing emphasis toward servers 130a,b rather than toward clients. Since index processing services can be centralized, administration of the indices can be administered more conveniently in certain cases.

The simplest NDTP server constellation 110 is a single server 130, and the protocol is designed to permit massive scale with a single or simple server constellation. Highly configurable installations are possible using "client-centric" or "server-centric" techniques. NDTP server constellations 110 composed of more than one NDTP server may use any combination of the two approaches for performance optimization and data ownership properties. Client-centric and server-centric approaches can be used to build NDTP server clusters, NDTP server trees, NDTP server trees of NDTP server clusters, or any other useful configuration.

NDTP design thus explicitly addresses the emerging "peer-to-peer" topologies called "pure" and "hybrid". The "pure" peer-to-peer approach emphasizes symmetric communication among peers, and is achievable through the "server-centric" approach. The "hybrid" peer-to-peer approach emphasizes asymmetric communication among non-peer participants, and is achievable through the "client-centric" approach. Beyond the pure and hybrid approaches that NDTP allows, as described above, NDTP permits any additional mixtures between client-centric and server-centric approaches to provide superior configurability and performance tuning.

Security

NDTP preferably has no provisions for security. Three key features of security should therefore be provided:

Data privacy (encryption)
Client 12 authentication
Client 12 authorization NDTP/TCP will be extended using SSL/X.509 to support these security features in a straightforward, 'industry standard' way.

Adding security to NDTP/UDP also requires technology other than SSL. For example, IPSec supports securing all IP traffic, not just TCP between two endpoints. IPSec is a somewhat more heavyweight technology than SSL, and the rate of adoption in industry is somewhat slow. Nonetheless, it can provide the relevant capabilities to NDTP/UDP.

Additional Transport Layers

The early-adopter portion of the industry is in a state of turmoil regarding network transport protocols. On one hand, TCP has provided decades of solid service, and is so widely implemented that the mainstream computer industry could not imagine using another protocol to replace it. On the other hand, TCP lacks several features that may be necessary to enable the next step in network applications. In particular, the TCP design assumed pure software implementations by relatively powerful host computer computers. However, developments in network technology have increased the packet rate that a TCP implementation must handle to deliver full network speed beyond the capabilities of even increasingly powerful host computers. To take the next step, much of the packet processing work must be off-loaded to hardware, and TCP's design makes this very difficult.

It is unclear whether it will become possible to implement the relevant portions of TCP in hardware in a timely fashion. If this does not happen, one of the many new transport layers currently under development (ST, SCTP, VI, etc.) may emerge as a market leader in high performance networking. In this case, a layering of NDTP on top of a new hardware accelerated transport would permit NDTP servers to deliver greatly increased transaction rates. Even with the use of a hardware accelerated transport layer, however, the only benefit to a typical NDTP client would be lower cost of service due to cheaper NDTP server platform requirements. On the flip side, NDTP clients could likely still use a cheaper software implementation of the new transport because of individual clients' modest performance demands.

As can be seen, the Network Distributed Tracking Protocol is a networking protocol that runs on top of any stream (e.g. TCP) or datagram (e.g. UDP) network transport layer. The goal of NDTP is to support a network service that efficiently manages mappings from each individual key string, an identifier, to an arbitrary set of strings, locations. NDTP permits protocol participating clients to add and remove identifier/location associations, and request the current set of locations for an identifier from protocol servers.

NDTP is designed for use in the larger context of a distributed data collection. As such, it supports an architecture, in which information about where data associated with particular application entities, can be managed and obtained independently of the data itself. One way to understand this is as a highly dynamic DNS for data. DNS maintains a mapping between names and machines. NDTP and its associated servers maintain a mapping between entity identifiers and data locations. The identifier/location mapping maintained by NDTP servers is much more dynamic (more frequent updates), than the domain name/IP address mapping maintained by DNS. NDTP is designed to support very fast, very diverse, and very large scale mapping manipulations.

Regardless of the expected system context of NDTP in a distributed data collection, those skilled in the art will appreciate that NDTP can be used for any application in which one-to-zero or one-to-many associations among strings are to be maintained and accessed on a network. In applications of NDTP other than distributed databases, the term identifier is likely to make sense in most cases, but the term location may not. In any context, however, although NDTP supports identifier and location strings of up to $2^{32}-4$ bytes in length, it is a general assumption that the strings are typically short.

Those skilled in the art will note that the invention provides for the management and manipulation of indices and their associated relationships. Even more importantly, it is the manipulation of dynamic and spontaneous relationships between indices and locations, not the indices and locations, that is the core significance. The Network Distributed Tracking Protocol was written to manipulate these relationships, of which indices (identifiers) and locations are components of the aggregate solution.

It is to be understood that a wide range of changes and modifications to the embodiments described above will be apparent to those skilled in the art, and are contemplated. It is therefore intended that the foregoing detailed description be regarded as illustrative, rather than limiting, and that it be understood that it is the following claims, including all equivalents, that are intended to define the spirit and scope of the invention.

We claim:

1. A system for managing data stored in a distributed network, the system comprising:

a data repository configured to store a data entity, wherein an identifier string identifies the data entity; and a data location server network comprising a plurality of data location servers, wherein data location information for a plurality of data entities is stored in the data location server network, at least one of the plurality of data location servers includes location information associated with the identifier string, each one of the plurality of data location servers comprises a processor and a portion of the data location information, the portion of the data location information included in a corresponding one of the data location servers is based on a hash function used to organize the data location information across the plurality of data location servers, and each one of the data location servers is configured to determine the at least one of the plurality of data location servers based on the hash function applied to the identifier string.

2. The system of claim 1, wherein the location information comprises any portion of a hash table generated with the hash function.

3. The system of claim 1, wherein the data repository comprises a plurality of data repository servers and wherein each of the plurality of data location servers is configured, in response to a request to store data in the data repository, to execute the hash function and store the data on one of the plurality of data repository servers based on a result of the hash function.

4. The system of claim 1, wherein each one of the data location servers is configured to return all location information associated with a respective one of the data entities in response to a request for any location information associated with the respective one of the data entities.

5. The system of claim 1, wherein the location information includes a hash table and the hash table includes an association between a hash of the string identifier and at least one identifier of the at least one of the plurality of data location servers.

6. A system for managing data location information and providing the data location information in response to location queries, the system comprising:
    a location server configured to receive a location addition request, the location addition request formatted in conformance with a transfer protocol, the location addition request comprising an identifier and at least one location to associate with the identifier, wherein the identifier identifies an entity and wherein each of the at least one location specifies a location of data in a network pertaining to the entity;
    wherein the location server includes a processor; and
    programming logic stored on the location server, wherein the programming logic is configured to return, in response to a location query related to a desired entity, a location message, the location message in conformance with the transfer protocol and comprising at least one location associated with the desired entity, wherein the programming logic is further configured to return the location message if the location server contains location information for the desired entity, and wherein the programming logic is further configured to return a redirect message if the location server lacks the location information for the desired entity, the redirect message comprising a list of at least one other location server known to have the location information for the desired entity.

7. The system of claim 6, wherein the list of at least one other location server comprises a list of a plurality of location servers in the network and a corresponding list of a plurality of entities having location information on the respective one of the plurality of location servers.

8. The system of claim 6, wherein each of a plurality of location servers in the network stores only a portion of the data location information.

9. The system of claim 6, wherein the location information in the location server is maintained in an indexed location store.

10. The system of claim 9, wherein the indexed location store comprises a string store indexed by a hash table.

11. The system of claim 9, wherein the indexed location store comprises a string store indexed by a hash table distributed across a plurality of clients.

12. The system of claim 9, wherein the indexed location store comprises a string store indexed by a hash table distributed across a plurality of servers.

13. The system of claim 9, wherein the location query identifying the desired entity comprises a unique identifier for the desired entity, and wherein the programming logic stored on the location server further comprises programming logic configured to apply an index function to the unique identifier to retrieve at least a portion of the locations associated with the unique identifier in the indexed location store.

14. The system of claim 13, wherein the indexed location store comprises a string store and the index function comprises a hash function.

15. A method of handling location queries in a network, the network comprising a plurality of location servers including data location information, the method comprising:
    correlating each one of a plurality of identifiers with at least one of a plurality of locations in the network, each one of the plurality of identifiers identifying a respective one of a plurality of data entities, wherein the data entities are stored in corresponding locations in the network;
    receiving a location query from a client at one of the plurality of location servers, the location query requesting location information identifying a location of a data entity included in the data entities;
    determining which of the plurality of location servers includes the location information;
    sending a location response message to the client in response to determining the one of the plurality of location servers includes the location information, the location response message comprising the location information; and
    sending a redirect message to the client in response to determining the one of the plurality of location servers fails to include the location information, the redirect message identifying which of the plurality of location servers includes the location information.

16. The method of claim 15, further comprising applying an identifier of the data entity to an indexing function to determine which of the location servers includes the location information.

17. The method of claim 16, wherein each one of the plurality of location servers comprises a portion of an indexed table of the identifiers and corresponding associated locations, and wherein determining which of the plurality of location servers includes the location information comprises applying one of the identifiers to a hash function to look up corresponding associated locations in the indexed table, the one of the identifiers identifying the data entity.

* * * * *